US009591351B2

(12) United States Patent
Dewa et al.

(10) Patent No.: US 9,591,351 B2
(45) Date of Patent: Mar. 7, 2017

(54) RECEIVER, DISPLAY CONTROLLING METHOD, BROADCAST SYSTEM, AND COMPUTER PROGRAM

(75) Inventors: Yoshiharu Dewa, Tokyo (JP); Alexandre Keller Albalustro, Sao Paulo (BR)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/234,301

(22) PCT Filed: Jul. 17, 2012

(86) PCT No.: PCT/JP2012/068055
§ 371 (c)(1),
(2), (4) Date: May 21, 2014

(87) PCT Pub. No.: WO2013/018532
PCT Pub. Date: Feb. 7, 2013

(65) Prior Publication Data
US 2014/0250481 A1 Sep. 4, 2014

(30) Foreign Application Priority Data
Jul. 29, 2011 (JP) .................. 2011-166503

(51) Int. Cl.
*G06F 3/00* (2006.01)
*G06F 13/00* (2006.01)
(Continued)

(52) U.S. Cl.
CPC .......... *H04N 21/433* (2013.01); *H04H 20/18* (2013.01); *H04H 20/91* (2013.01); *H04H 20/93* (2013.01);
(Continued)

(58) Field of Classification Search
CPC ........... H04N 21/4348; H04N 21/4622; H04N 21/6547; H04N 21/8586; H04N 21/42653; H04N 21/432
(Continued)

(56) References Cited

U.S. PATENT DOCUMENTS 5,828,421 A * 10/1998 Boyce .................. G06T 3/4084
348/565
6,349,410 B1 * 2/2002 Lortz ...................... H04N 5/76
375/E7.021
(Continued)

FOREIGN PATENT DOCUMENTS

EP  1 328 114 A1  7/2003
JP  10-174007 A   6/1998
(Continued)

OTHER PUBLICATIONS

International Search Report issued Aug. 28, 2012 in PCT/JP2012/068055.
(Continued)

*Primary Examiner* — Joshua Taylor
(74) *Attorney, Agent, or Firm* — Oblon, McClelland, Maier & Neustadt, L.L.P.

(57) ABSTRACT

To compound broadcast content and network content and suitably reproduce the two pieces of content concurrently using a data broadcast service.
A broadcaster and an application provider, for example, upload AV content related to broadcast content to a server, and deliver a data broadcast application containing a URL link to AV content. Each of selection buttons of a mosaic-type menu contains a URL link to AV content. The broadcaster and the application provider can control what should be a streaming moving picture that a user reproduces concurrently with viewing a program.

11 Claims, 18 Drawing Sheets

(51) Int. Cl.
*H04N 5/445* (2011.01)
*H04N 21/433* (2011.01)
*H04H 20/18* (2008.01)
*H04H 20/91* (2008.01)
*H04H 20/93* (2008.01)
*H04H 60/13* (2008.01)
*H04N 21/434* (2011.01)
*H04N 21/462* (2011.01)
*H04N 21/6547* (2011.01)
*H04N 21/858* (2011.01)
*H04N 21/426* (2011.01)
*H04H 60/82* (2008.01)
*H04N 21/432* (2011.01)

(52) U.S. Cl.
CPC ............ *H04H 60/13* (2013.01); *H04H 60/82* (2013.01); *H04N 21/42653* (2013.01); *H04N 21/432* (2013.01); *H04N 21/4348* (2013.01); *H04N 21/4622* (2013.01); *H04N 21/6547* (2013.01); *H04N 21/8586* (2013.01)

(58) Field of Classification Search
USPC ........................................ 725/48–59; 348/564
See application file for complete search history.

(56) References Cited

U.S. PATENT DOCUMENTS

| | | | | |
|---|---|---|---|---|
| 2002/0118296 | A1* | 8/2002 | Schwab | C12Q 1/6883 348/441 |
| 2003/0231259 | A1* | 12/2003 | Yui et al. | 348/564 |
| 2009/0049409 | A1* | 2/2009 | Leclercq et al. | 715/838 |
| 2010/0088733 | A1* | 4/2010 | Chan et al. | 725/80 |

FOREIGN PATENT DOCUMENTS

| | | |
|---|---|---|
| JP | 2007-208340 A | 8/2007 |
| JP | 2008-109606 A | 5/2008 |
| JP | 2009-296126 A | 12/2009 |
| JP | 2009-303062 A | 12/2009 |
| JP | 2010-166339 A | 7/2010 |
| JP | 2011-023883 A | 2/2011 |
| JP | 2011-23883 A | 2/2011 |
| JP | 2011-107908 A | 6/2011 |

OTHER PUBLICATIONS

Extended European Search Report issued Feb. 23, 2015 in Patent Application No. 12820008.6.

Office Action issued Mar. 29, 2016 in Japanese Patent Application No. 2011-166503.

* cited by examiner

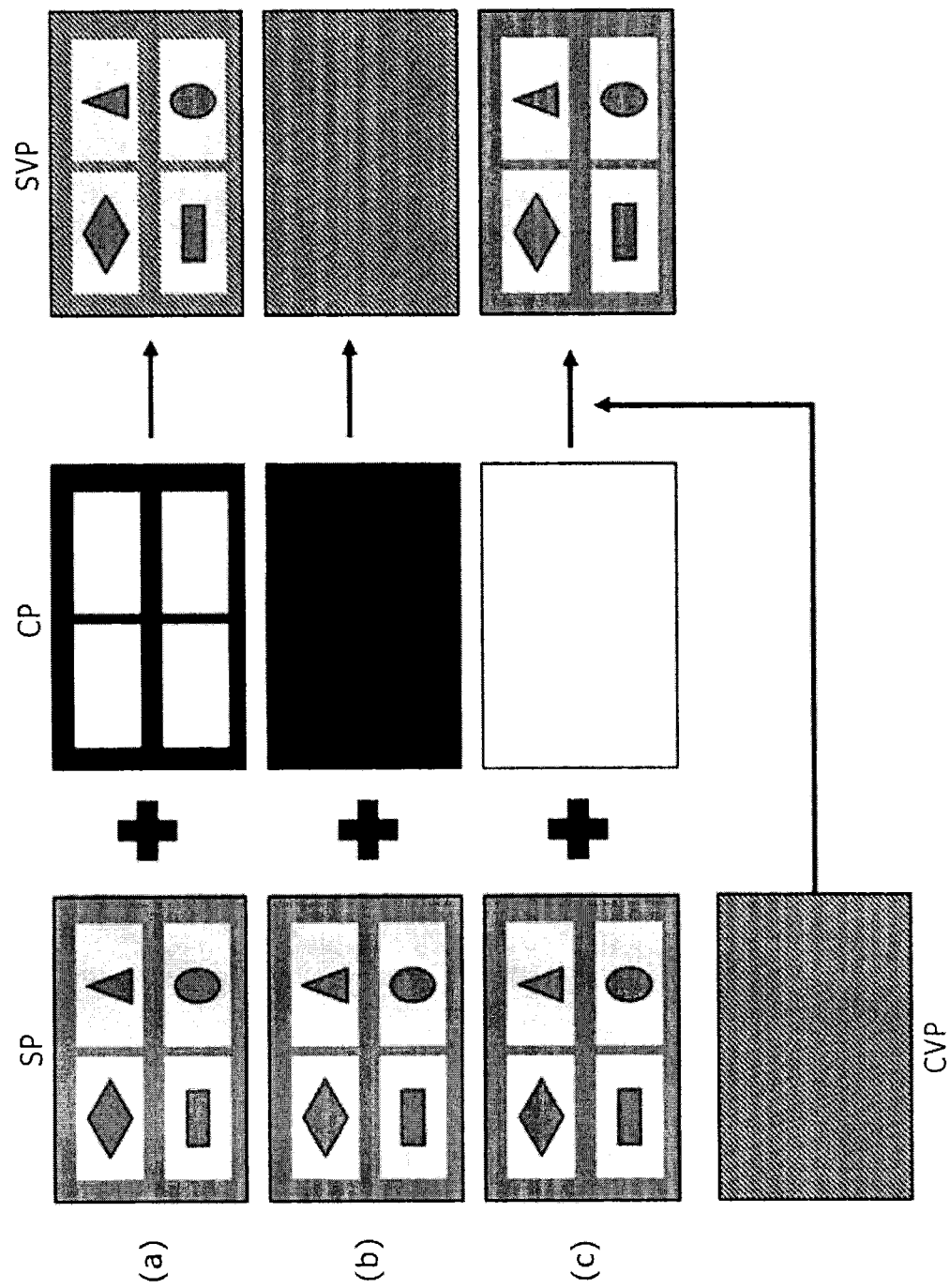

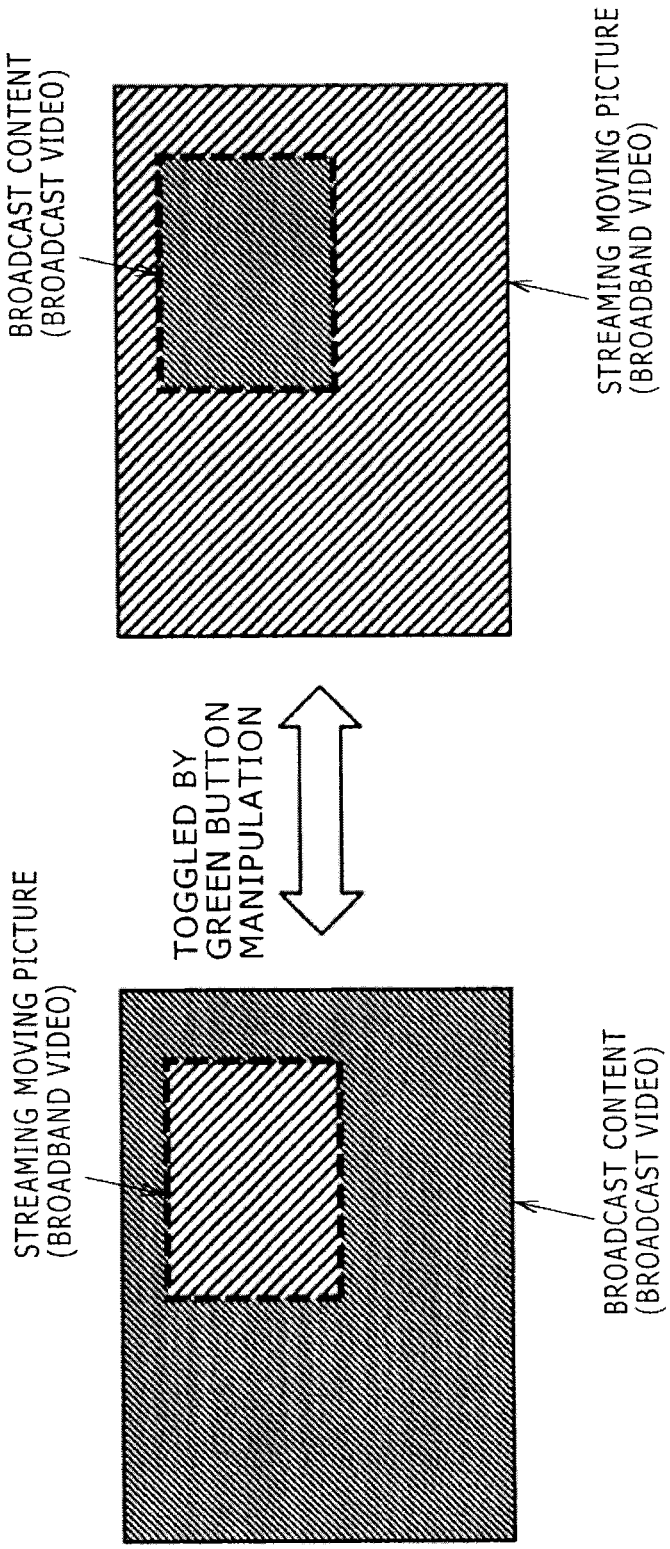

RECEIVER, DISPLAY CONTROLLING METHOD, BROADCAST SYSTEM, AND COMPUTER PROGRAM

TECHNICAL FIELD

The technology disclosed in the present description relates to a receiver, a display controlling method, a broadcast system, and a computer program which receives a broadcast signal and displays broadcast content. More specifically, the technology disclosed in the present description relates to a receiver, a display controlling method, a broadcast system, and a computer program which compounds broadcast content obtained from a broadcast signal with network content acquired via a network and reproduces the two pieces of content concurrently.

BACKGROUND ART

At the present time, in countries around the world, digitalization is being promoted in broadcast systems using a ground wave, a satellite wave, a cable, and the like. Digital signals are superior to analog signals in stability, and have a high data compression rate. Thus, in digital broadcasting, more channels can be ensured within a given bandwidth compared to broadcasting with analog signals. In addition, in digital broadcasting, a data broadcast can also be transmitted, which makes it possible to realize a hybrid broadcast service in combination with another service.

For example, with regard to digital broadcasting utilizing the ISDB (Integrated Services Digital Broadcasting) system started in Japan in 2000, data broadcasting is one of its features. In this system, in addition to video and audio data (AV data) composing the main body of a broadcast program, digital transmission data associated with the broadcast program (hereinafter referred to as "data for data broadcast or data-broadcast data") is delivered in parallel with the AV data by a broadcaster or the like. To be more specific, the broadcast signal is delivered in the form of a transport stream composed by multiplexing AV data compressed by a certain compression method such as MPEG (Moving Picture Expert Group) 2 and data for data broadcast coded in a coding method such as BML (Broadcast Markup Language). BML is based on XML (eXtensible Markup Language) and includes functions such as a function for specifying a location of multimedia data, a script execution function by ECMA script which is a standard description of Java (registered trademark) script, and a function for operating XML by the DOM (Document Object Model).

A data broadcast for TVs, for example, is displayed when a user viewing a television program (hereinafter referred to as "broadcast content") manipulates a "d" (data linkage) button provided on a remote controller. Specifically, when the "d" button is manipulated at a time where the broadcast content is being fully displayed on the TV screen, a browser for data broadcasting which interprets the data for data broadcasting written in the BML format is activated, and the state of the screen changes to a data broadcast display.

The data for data broadcast, for example, includes media data such as a still picture, moving picture, sound, figure, and character, and a data broadcast application which merges these pieces of data and controls the expression form and operation thereof. The user (viewer of the digital broadcast), for example, can instruct an operation of each media data piece on the data broadcast display screen by using a cursor key, a decision key, a color button, or number buttons (number keypad) on the remote controller. Utilities such as broadcasters can realize a data broadcast service associated with the main broadcast program by using the data broadcast application.

The Java (registered trademark) technique, for example, can be applied to the data broadcast application. In a case applying the Java technique, the data broadcast application is composed of class files which are byte codes operated on a Java (registered trademark) virtual machine. The Java virtual machine within a receiver (e.g., a television set) runs received class files, thereby providing the data broadcast service to the viewer. There are plural class files necessary for executing one Java (registered trademark) data broadcast service. Thus, the Java (registered trademark) data broadcast service cannot be executed until all of the class files are obtained. It is also possible to accumulate in the receiver class files that were used when a certain Java (registered trademark) data broadcast service was executed once, and utilize the class files for a similar Java (registered trademark) data broadcast service thereafter. For example, there is proposed a program file acquiring apparatus which acquires lacked one(s) of essential program files essential to execute the broadcast service specified by the user through a selected acquisition path (for example, refer to PTL 1).

On the other hand, along with the spread of broadband communication networks, it has become possible to transmit large-capacity data of a moving picture or the like through the Internet. For example, an information processor is proposed which can download and accumulate content such as a movie through the Internet (hereinafter referred to as "network content"), and can reproduce the network content at any timing (for example, refer to PTL 2). In addition, there is proposed a receiver which changes a display state of broadcast content and a display state of network content in a seamless manner (for example, refer to PTL 3).

According to the receiver of the latter, a shared browser which can display both of the data broadcast display and the pseudo data broadcast display (i.e., capable of interpreting both BML and HTML) is run in advance. The shared browser controls displaying/non-displaying, thereby enabling mutual and direct shifting between the data broadcast display in a broadcast content mode and the pseudo data broadcast display in a network content mode in a seamless manner.

However, although this receiver executes a process for merging the broadcast content and the network content, the receiver does not differ from a technology in the related art in that it displays the network content by interpreting HTML. That is to say, this receiver does not interpret BML, that is, does not display the network content as a data broadcast service. In other words, a broadcaster or the like cannot provide by data broadcasting a hybrid broadcast service in which broadcast content and network content are combined.

CITATION LIST

Patent Literature

[PTL 1]
JP 2010-166339A
[PTL 2]
JP 2008-109606A
[PTL 3]
JP 2009-296126A

SUMMARY

Technical Problem

An object of the technology disclosed in the present description is to provide a receiver, a display controlling method, a broadcast system, and a computer program adapted to be capable of compounding broadcast content obtained from a broadcast signal and network content acquired via a network, and suitably reproducing the two pieces of content concurrently.

Another object of the technology disclosed in the present description is to provide a receiver, a display controlling method, a broadcast system, and a computer program that can compound broadcast content and network content and suitably reproduce the two pieces of content concurrently using a data broadcast service.

Solution to Problem

The present disclosure has been made in view of the above problem, and the technique as set forth in claim 1, is a receiver including:
a broadcast receiving portion receiving a broadcast signal;
a network communication portion transmitting and receiving information via a network;
a video memory including a first plane and a second plane, the first plane copying the information received by the broadcast receiving portion, the second plane copying the information received by the network communication portion;
a display portion displaying the information in the video memory; and
a control portion controlling a display output of the information copied on the planes in the video memory to the display portion, wherein
the control portion runs a data broadcast application received by one of the broadcast receiving portion and the network communication portion, executes a process compounding plural planes in the video memory including the first plane and the second plane, and displays the resulting composite plane on the display portion.

According to the technique as set forth in claim 2 of the present disclosure, in the receiver according to claim 1, the first plane and the second plane are disposed in this order from backward to forward within the video memory, and the other planes of the plural planes are disposed in a predetermined order in front of the second plane, and the control portion executes, as a process realized by running the data broadcast application, the process compounding the planes in accordance with the disposition order.

According to the technique as set forth in claim 3 of the present disclosure, in the receiver according to claim 2, as a process realized by running the data broadcast application, the control portion copies on the first plane broadcast content received by the broadcast receiving portion, copies on the second plane a user interface used to instruct concurrent reproduction of the broadcast content and network content received by the network communication portion, and compounds the first plane and the second plane to create a plane in which the user interface is superimposed on the broadcast content.

According to the technique as set forth in claim 4 of the present disclosure, in the receiver according to claim 3, the network content reproduced concurrently with the broadcast content is a streaming moving picture, and the user interface is a menu in which moving picture thumbnails of plural streaming moving pictures capable of being reproduced concurrently are disposed as selection buttons.

According to the technique as set forth in claim 5 of the present disclosure, in the receiver according to claim 3, a location of the network content capable of being reproduced concurrently with the broadcast content is specified by the data broadcast application, the user interface is a menu in which selection buttons each including a link to a location of network content capable of being reproduced concurrently are disposed, and in response to selection of any of the selection buttons, the control portion copies on the second plane the network content received by the network communication portion in accordance with the link contained in the selected selection button, compounds the first plane and the second plane, and concurrently reproduces the broadcast content and the network content.

In addition, the technique as set forth in claim 6 of the present disclosure is a display controlling method including:
a first copying step of copying information received as a broadcast signal on a first plane in a video memory by first copying means, the first copying means being realized by running a data broadcast application by a computer;
a second copying step of copying information received via a network on a second plane in the video memory by second copying means, the second copying means being realized by running the data broadcast application by the computer;
a compounding step of compounding plural planes including the first plane and the second plane in the video memory by compounding means, the compounding means being realized by running the data broadcast application by the computer; and
an outputting step of outputting a composite plane to be displayed created by the compounding step by displaying means, the displaying means being realized by running the data broadcast application by the computer.

In addition, the technique as set forth in claim 7 of the present disclosure is a broadcast system including:
a broadcast station providing a data broadcast service including a combination of broadcast content and a data broadcast;
a server providing network content; and
a hybrid terminal receiving a broadcast signal delivered from the broadcast station and transmitting and receiving information via a network, wherein
the hybrid terminal includes a video memory including a first plane copying the information received as the broadcast signal and a second plane copying the information received from the server, and a display portion displaying the information in the video memory, and executes a data broadcast application received from one of the broadcast station and the server to execute a process compounding plural planes including the first plane and the second plane, thereby displaying the resulting composite plane on the displaying portion.

It is to be noted that the word "system" stated herein means a logical collection of devices or apparatuses (or functional modules each realizing a specific function). Thus, whether or not the devices or the apparatuses, or the functional modules are assembled in a single chassis does not matter.

In addition, the technique as set forth in claim 8 of the present disclosure is a computer program written in a computer-readable form for causing a computer to function as:
first copying means configured to copy information received as a broadcast signal on a first plane in a video memory;

second copying means configured to copy information received via a network on a second plane in the video memory;

compounding means configured to compound plural planes including the first plane and the second plane in the video memory; and outputting means configured to output the resulting composite plane to be displayed created by the compounding means.

The computer program according to claim 8 of the present disclosure is such that a computer program written in a computer-readable form is defined so as to realize predetermined processes on the computer. In other words, installing the computer program according to claim 8 of the present disclosure in the computer, a cooperative effect is exhibited on the computer, whereby the same effects as those produced by the receiver according to the claim 1 of the present disclosure can be obtained.

Advantageous Effects of Invention

According to the technology disclosed in the present description, there can be provided a receiver, a display controlling method, a broadcast system, and a computer program, in which broadcast content obtained from a broadcast signal and network content acquired via a network can be compounded and reproduced concurrently in a suitable manner.

In addition, according to the technology disclosed in the present description, there can be provided a receiver, a display controlling method, a broadcast system, and a computer program, in which broadcast content and network content can be compounded and reproduced concurrently in a suitable manner using a data broadcast service.

The above and other features and advantageous effects of the technology disclosed in this description will become apparent from a more detailed description on embodiments and accompanying drawings described hereafter.

BRIEF DESCRIPTION OF DRAWINGS

FIG. 9 shows diagrams indicating examples of variations in composite planes SVP of a moving picture and a still picture caused by changing a moving picture/still picture switching plane CP applied.

FIG. 14 is a diagram showing a situation of switching the disposition order of a moving picture plane #1 and a moving picture plane #2.

DESCRIPTION OF EMBODIMENTS

Embodiments of the technology disclosed in the present description will be described in detail hereinafter with reference to the accompanying drawings.

Figure 1:
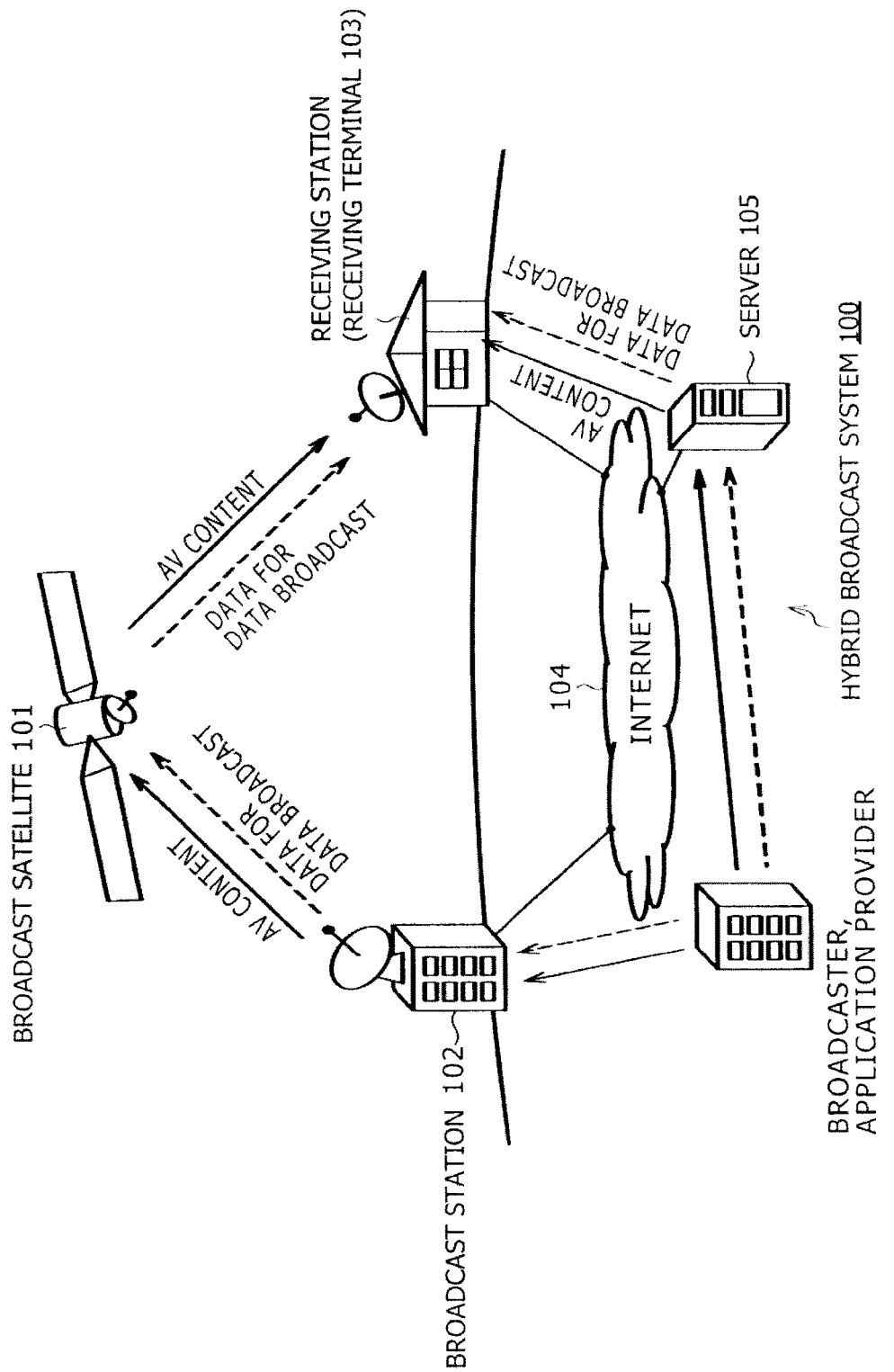
FIG. 1 is a view schematically showing a basic configuration of a hybrid broadcast system 100 in which a broadcast and a network are merged.

FIG. 1 schematically shows a basic configuration of a hybrid broadcast system 100 in which a broadcast and a network are merged.

A broadcast satellite 101 rotates around the earth in the space. A broadcaster delivering broadcast content transmits AV content, the main broadcast program, and an application provider providing a data broadcast application transmits data-broadcast data to the broadcast satellite 101 from an uplink such as a broadcast station 102. The broadcast satellite 101 retransmits the received AV content and data-broadcast data to receiving stations on the earth located at various areas.

Incidentally, the AV content and the data-broadcast data may be delivered by ground waves without using the broadcast satellite 101 instead of by satellite waves using the broadcast satellite 101. In addition, the receiving stations are for example a receiving terminal 103 such as a television set installed in ordinary homes. The receiving terminal 103 is also connected to a broadband network such as the Internet 104 as a back channel, and thus can also acquire network content such as a moving picture streaming. The receiving terminal 103 which can handle both broadcast content and network content may be hereafter referred to as a "hybrid terminal" as well.

In addition, the broadcaster and the application provider may upload the AV content and the data for data broadcast to a web server 105 built on the broadband network such as the Internet 104. In such cases, the hybrid terminal 103 can also acquire (download) the AV content and the data for data broadcast via the back channel such as the internet 104 without using broadcast waves.

The broadcaster and the application provider, for example, upload AV content related to the broadcast content, and deliver a data broadcast application containing a URL (Uniform Resource Locator) link that indicates the location of the AV content within the web server 105 by using the broadcast signal or via the Internet 104. The broadcaster and the application provider can thereby control the streaming moving picture which a user using a data broadcast service of a broadcast program accesses in association with viewing the program.

Figure 2:
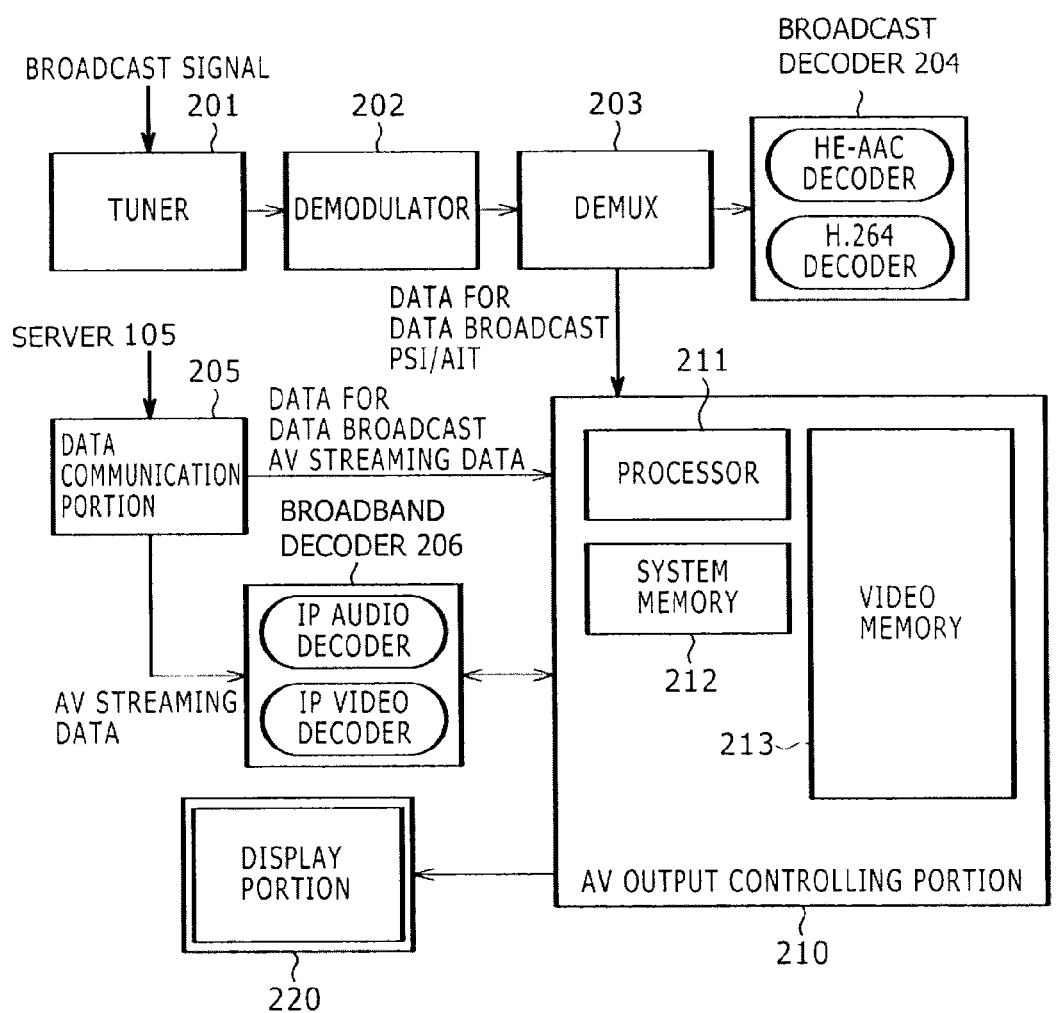
FIG. 2 is a block diagram showing an example of an internal configuration of a hybrid terminal 103.

FIG. 2 shows an internal configuration of the hybrid terminal 103. Similarly to common television sets, the hybrid terminal 103 can receive a terrestrial digital broadcast and a satellite digital broadcast. In addition, the hybrid terminal 103 can download network content from a predetermined server 105 on the Internet 104.

The hybrid terminal 103 includes a tuner 201, a demodulator 202, a demultiplexer (DEMUX) 203, and a broadcast decoder 204 as a system for processing broadcast content.

The tuner 201 extracts a frequency component corresponding to channel selection from the broadcast signal inputted thereto through an antenna or a CATV cable, and the demodulator 202 demodulates the extracted broadcast signal.

The demultiplexer 203 separates the frequency component of the broadcast signal corresponding to the channel tuning into coded AV data such as an MPEG2 transport stream and a signal of data-broadcast data.

The broadcast decoder 204 decodes the AV data coded with standards such as HE-AAC or H.264 and reproduces the audio signal and the video signal. The reproduced audio signal and video signal, and the data-broadcast data containing PSI (Program Specific Information) and an AIT (Application Information Table) are supplied to an AV output controlling portion 210.

In addition, the hybrid terminal 103 includes a data communication portion 205 and a broadband decoder 206 as a system for processing network content.

The data communication portion 205 is formed of, for example, an Ethernet (registered trademark) interface. The data communication portion 205 accesses the predetermined server 105 through the Internet 104 or the like, downloads network content and supplies the content to the AV output controlling portion 210. The downloaded network content contains data for data broadcast and AV streaming content.

The AV streaming data received via the network is in the format of ASF, MOV, or MP4, for example. The broadband decoder 206 includes an IP audio decoder and an IP video decoder, and decodes such sort of AV streaming data to reproduce the audio signal and the video signal.

In addition, the data for data broadcast includes various kinds of media data such as still picture data and text data in JPEG or PNG format, and also a data broadcast application written in BML or XML format. An example of a technology applicable to the data broadcast application is the Java (registered trademark) technology, but the technology applicable in embodiments of the present description is by no means limited to the Java technology. The AV output controlling portion 210 interprets the data broadcast application and controls the picture display form of the broadcast content, the AV streaming data and the like on the display portion 22.

The AV output controlling portion 210 includes a processor 211, a system memory 212, and a video memory 213.

The video memory 213 includes a moving picture plane #1, a moving picture plane #2, graphic planes, and a video buffer. The moving picture plane #1 copies the video signal reproduced by the broadcast decoder 204. The moving picture plane #2 copies the AV streaming data downloaded via the Internet 104. The graphic planes respectively copy the still picture, the figure and character, and the like contained in the data for data broadcast. The planes and the video buffer will be described later in details.

Figure 17:
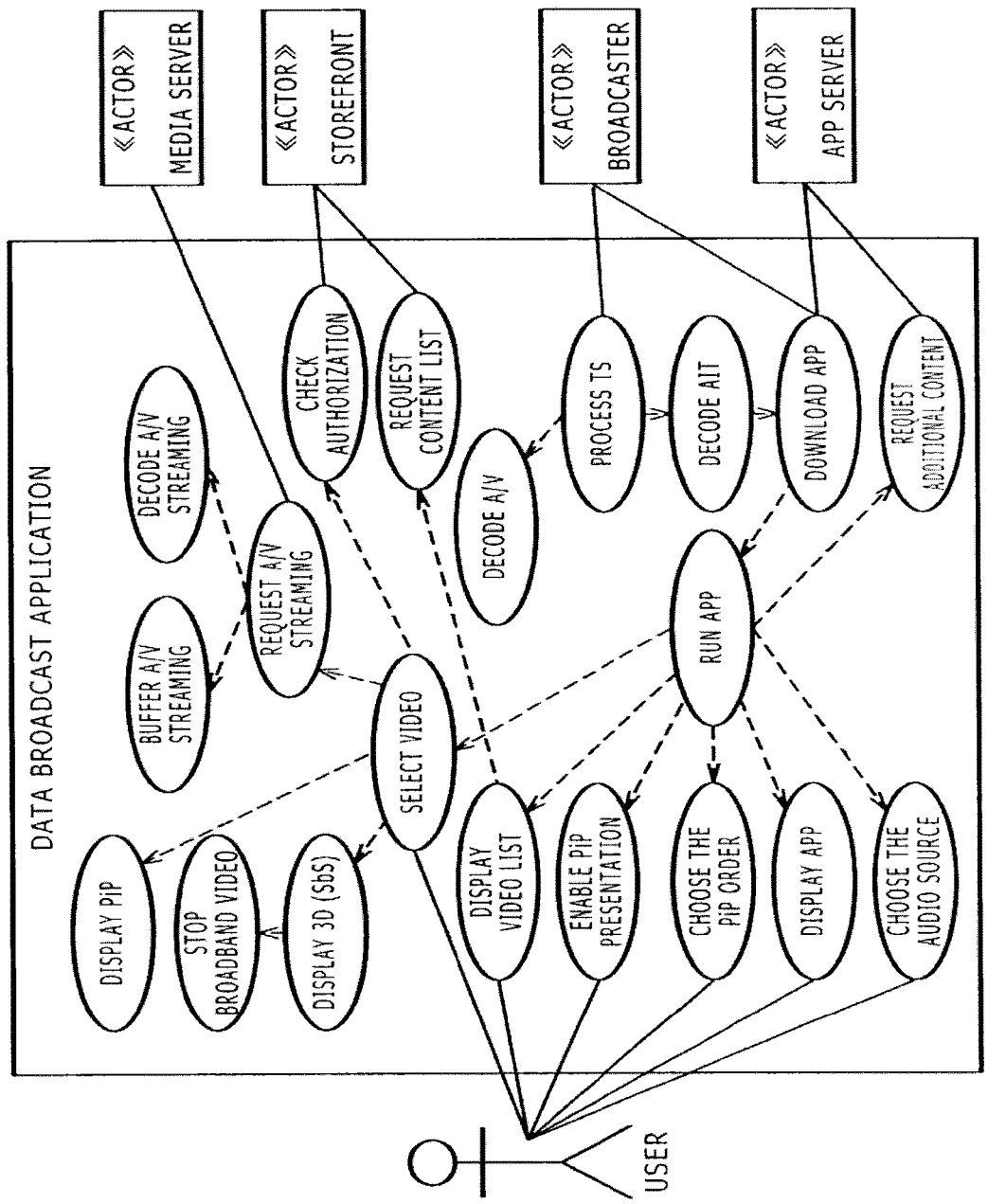
FIG. 17 is a block diagram showing functional blocks which are realized by running the data broadcast application with a processor 211.

The processor 211 runs a data broadcast application loaded into the system memory 212, and assembles a picture to be displayed on the display portion 220 from the graphic planes copied in the plane memories inside the video memory 213 described above. FIG. 17 shows functional blocks which are realized by running the data broadcast application with the processor 211. For example, when the Java (registered trademark) technique is applied to the data broadcast application, the functional blocks correspond to class files. The details of the functional blocks will be described later.

Figure 3:
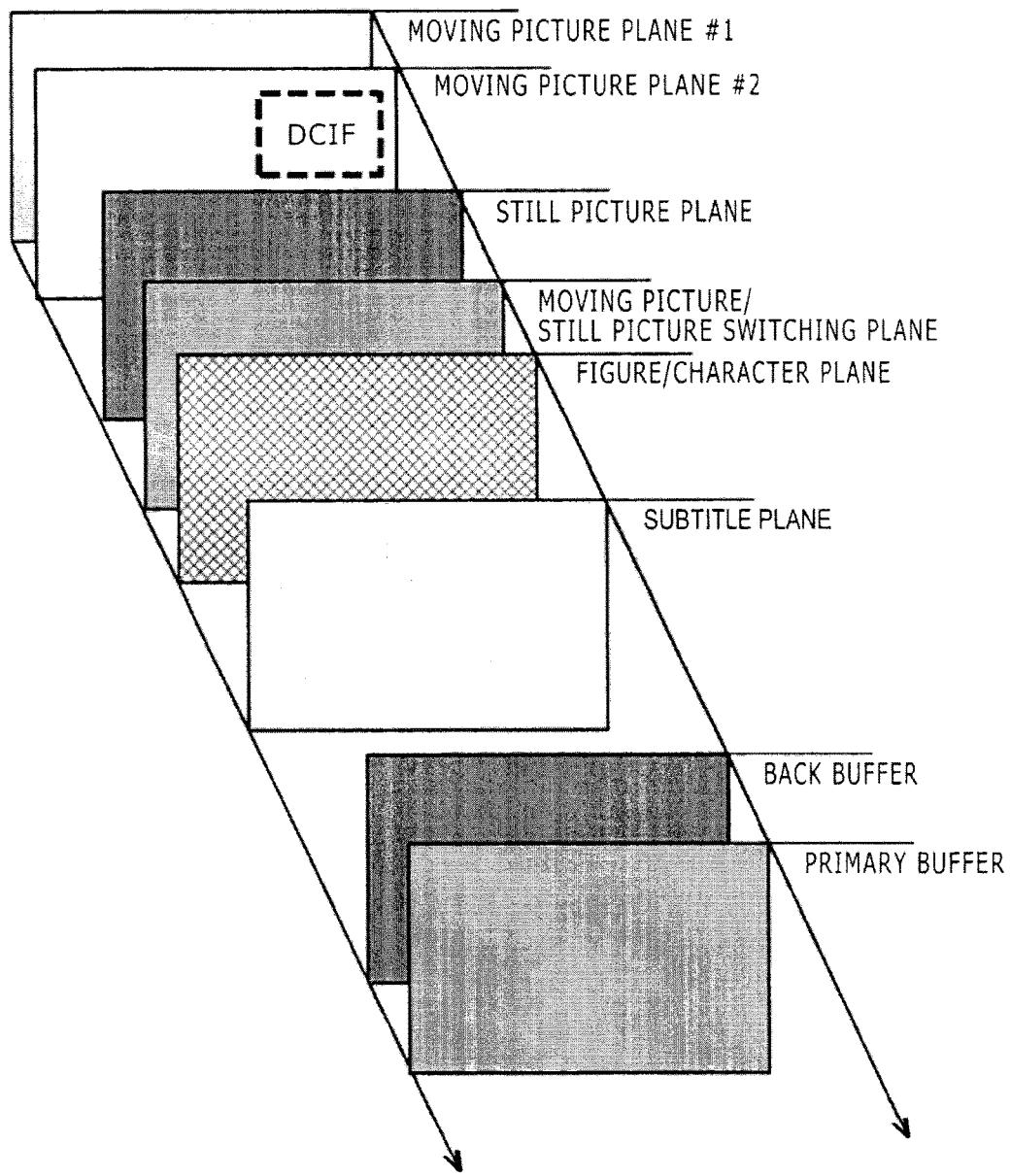
FIG. 3 is a view showing a model of graphic planes configured on a video memory 213.

FIG. 3 shows a model of the graphic planes structured on the video memory 213. In the case shown in the figure, the planes of the moving picture plane #1 (Primary Video Plane), the moving picture plane #2 (Secondary Video Plane), a still picture plane (Still-Picture Plane), a moving picture/still picture switching plane (Switching Plane), a figure and character plane (Graphics Plane), a subtitle plane (Subtitle Plane) are arranged in order from backward (Backward) to forward (Forward).

As described above, the moving picture of the received broadcast (the video signal reproduced by the broadcast decider 204) is copied on the moving picture plane #1. On the other hand, the streaming moving picture downloaded via the Internet 104 is copied on the moving picture plane #2. The picture copied on the moving picture plane #1 has a resolution corresponding to the full screen resolution of the display portion 220 (e.g., 1,920×1,080 pixels). The picture copied on the moving picture plane #2 has a default resolution which is lower than the full screen resolution (e.g., 528×384 pixels (DCIF)). At the time the streaming moving picture downloaded via the Internet 104 is to be copied on the moving picture plane #2, the picture may be resized as appropriate.

In addition, the still picture, the moving picture/still picture switching, the figure and character, and the subtitles contained in the data for data broadcast are copied on the still picture plane, the moving picture/still picture switching plane, the figure and character plane, and the subtitle plane, respectively.

The processor 211, for example, runs the application for data broadcast to realize a process for superimposing the planes in the order described above to thereby assemble the pictures. The final plane obtained through the assembling is held in the back buffer (Back Buffer). The picture to be displayed on the display portion 220 is held in a primary buffer (Primary Buffer).

In this embodiment, the processor 211 runs the data broadcast application to execute the processing for compounding the planes described above, thereby controlling the display form of the picture to be outputted on the display portion 220. Next, a description will be given with respect to the display form realized by running the data broadcast application.

Figure 4:
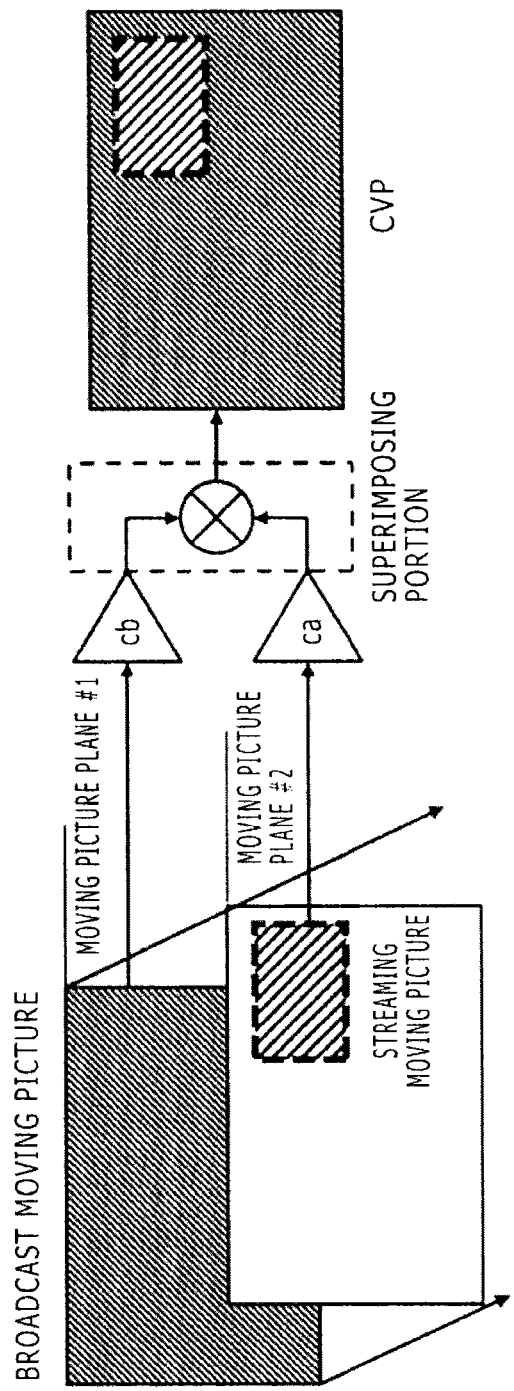
FIG. 4 is a diagram explaining basic processing for compounding moving picture planes.

FIG. 4 shows basic processing for compounding the moving picture planes. The processing shown in the figure is executed in the processor 211. In the case shown in the figure, the moving picture of the received broadcast (broadcast video) is copied on the moving picture plane #1 at the full resolution. On the other hand, the streaming moving picture received via the Internet 104 (broadband video) is resized to a low resolution (DCIF) and then copied on the moving picture plane #2 (described above). A superimposing portion superimposes the moving picture "ca" copied on the moving picture plane #2 on the moving picture "cb" copied on the moving picture plane #1 based on, for example, the Porter-Duff rules, thereby creating a composite moving picture plane (Composite Video Plane: CVP). The composite moving picture plane is a picture-in-picture (Picture in Picture: PiP) image in which the moving picture "ca" is embedded in the moving picture "cb."

A plane compounding rule applied to the superimposing portion is expressed by Expression (1). At a pixel position where the alpha blend value $\alpha_a$ of the front moving picture plane #2 is set to 1 to be 100% opaque, the moving picture "ca" copied on the moving picture plane #2 becomes the composite moving picture plane CVP. In addition, at a pixel position where the alpha blend value $\alpha_a$ of the front moving picture plane #2 is set to 0 to be 100% transparent, the moving picture "cb" copied on the moving picture plane #1 becomes the composite moving picture plane CVP. Basically, the alpha blend values $\alpha_a$ of the pixel positions inside the size of the moving picture copied on the moving picture plane #2 are set to 1, and the alpha blend values $\alpha_a$ of the pixel positions outside the area is set to 0. Therefore, the pixels of the composite moving picture plane CVP inside the size of the moving picture copied on the moving picture plane #2 display "ca," whereas the pixels of the composite moving picture plane CVP outside that area display "cb."

[Math. 1]

$$CVP = \begin{cases} ca: \text{when } \alpha_a \text{ is 1 (100\% opaque)} \\ cb: \text{when } \alpha_a \text{ is 0 (100\% transparency)} \end{cases} \quad (1)$$

Figure 5:
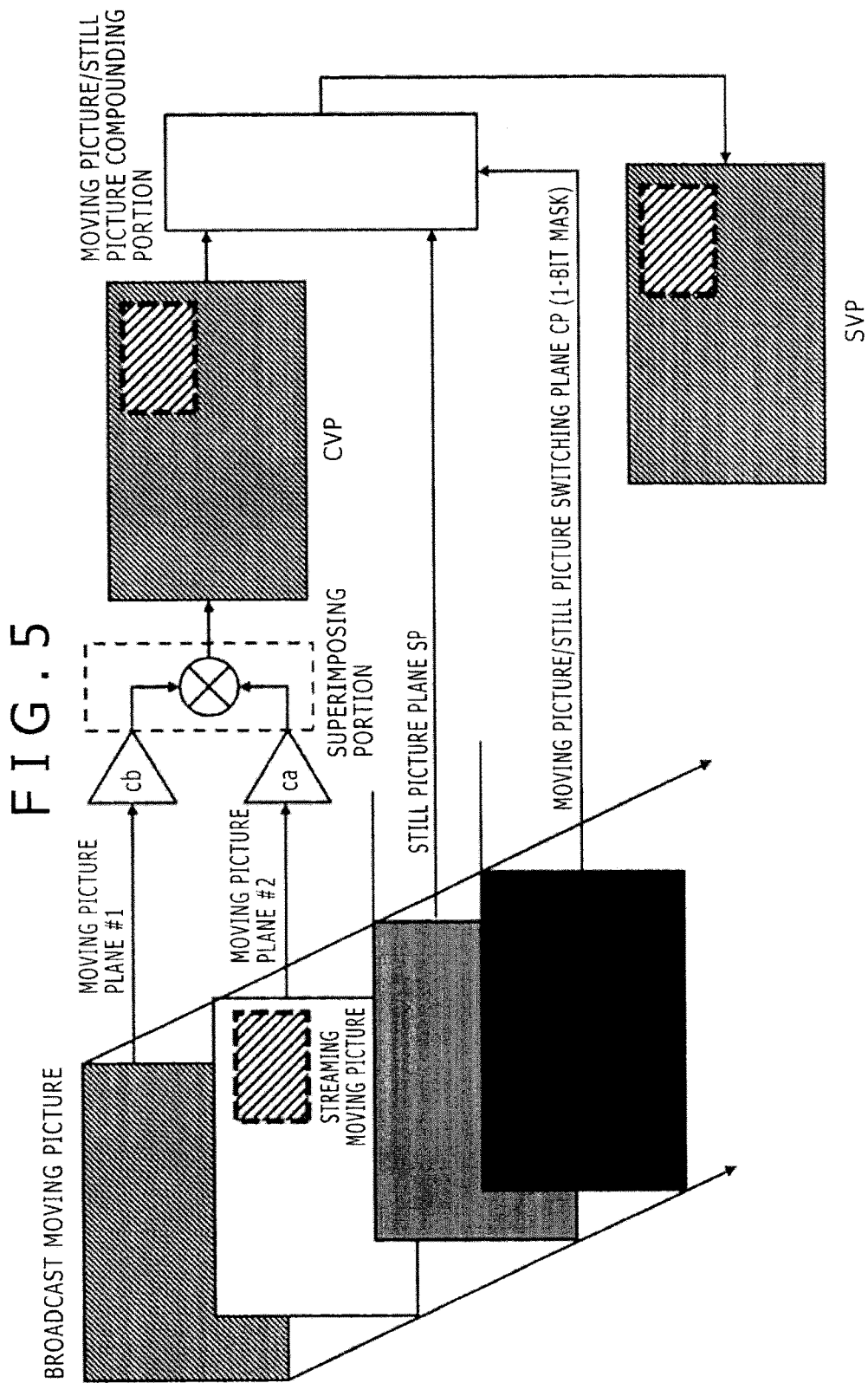
FIG. 5 is a diagram explaining basic processing for further compounding a still picture plane on a composite moving picture plane CVP.

FIG. 5 illustrates basic processing for further compounding a still picture plane SP on the composite moving picture plane CVP. The processing shown in the figure is executed in the processor 211. A mechanism for creating the composite picture plane CVP is the same as that described above.

The moving picture/still picture switching plane CP is a 1-bit mask that masks the still picture plane SP. A pixel position to be masked with the still picture plane SP is specified by a pixel value CP. As expressed by Expression (2), the pixel value CP is set to 0 for a pixel position to be masked with the still picture plane SP, and the pixel value CP is set to 1 for a pixel position not to be masked with the still picture plane SP.

[Math. 2]

$$CP = \begin{cases} 0: \text{when pixel is } (0, 0, 0, 1) \text{ i.e. opaque black pixel} \\ 1: \text{when pixel is not } (0, 0, 0, 1) \end{cases} \quad (2)$$

A moving picture/still picture compounding portion masks the pixels of the still picture plane SP based on the pixel value CP, and superimposes the still picture plane after completing the masking on the composite moving picture plane CVP based on, for example, the Porter-Duff rules, thereby creating a composite plane of the moving picture and the still picture (Composition of Video and Still-Picture Plane: SVP). In the case shown in FIG. 5, since the pixel value CP is 0 (black) for all of the pixel positions, all of the pixels of the still picture plane are masked, so that solely the composite moving picture plane CVP is outputted as the composite plane SVP of the moving picture and the still picture. A composite rule applied to the moving picture/still picture compounding portion is expressed by Expression (3). At the pixel positions where the moving pixel value CP is 1, that is, the still picture plane SP is not masked, the corresponding pixels display the still picture plane SP as the composite plane SVP. On the other hand, at the pixel positions where the pixel value CP is 0, that is, the still picture plane SP is masked, as a result of the still picture plane SP on the front being masked, the corresponding pixels display the composite moving picture plane CVP behind the still picture plane SP as the composite plane SVP.

[Math. 3]

$$SVP = \begin{cases} SP: \text{when } CP == 1 \\ CVP: \text{when } CP == 0 \end{cases} \quad (3)$$

Figure 6:
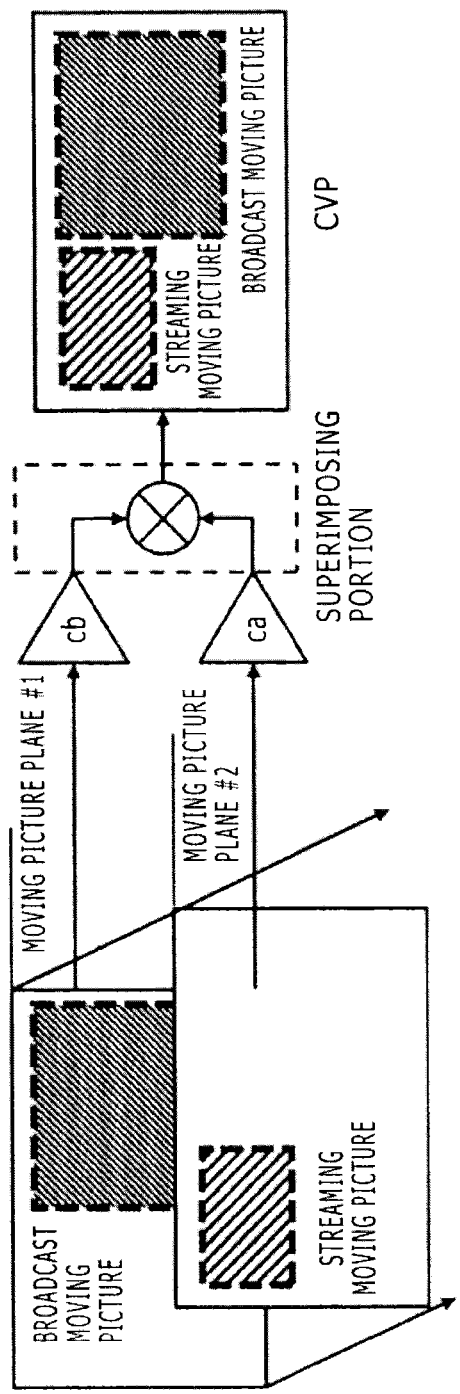
FIG. 6 is a block diagram explaining alternative processing for compounding moving picture planes.

Further, FIG. 6 shows alternative processing for compounding the moving picture planes. The processing shown in the figure is executed in the processor 211. In the case shown in FIG. 6, the moving picture of the received broadcast (broadcast video), and the streaming picture received via the Internet 104 (broadband video) are copied on the moving picture plane #1 and the moving picture plane #2, respectively, at resolutions lower than that of the whole screen. The superimposing portion superimposes the low-resolution moving picture "ca" copied on the moving picture plane #2 on the low-resolution moving picture "cb" copied on the moving picture plane #1 based on, for example, the Porter-Duff rules, thereby creating a composite moving picture plane CVP.

Figure 7:
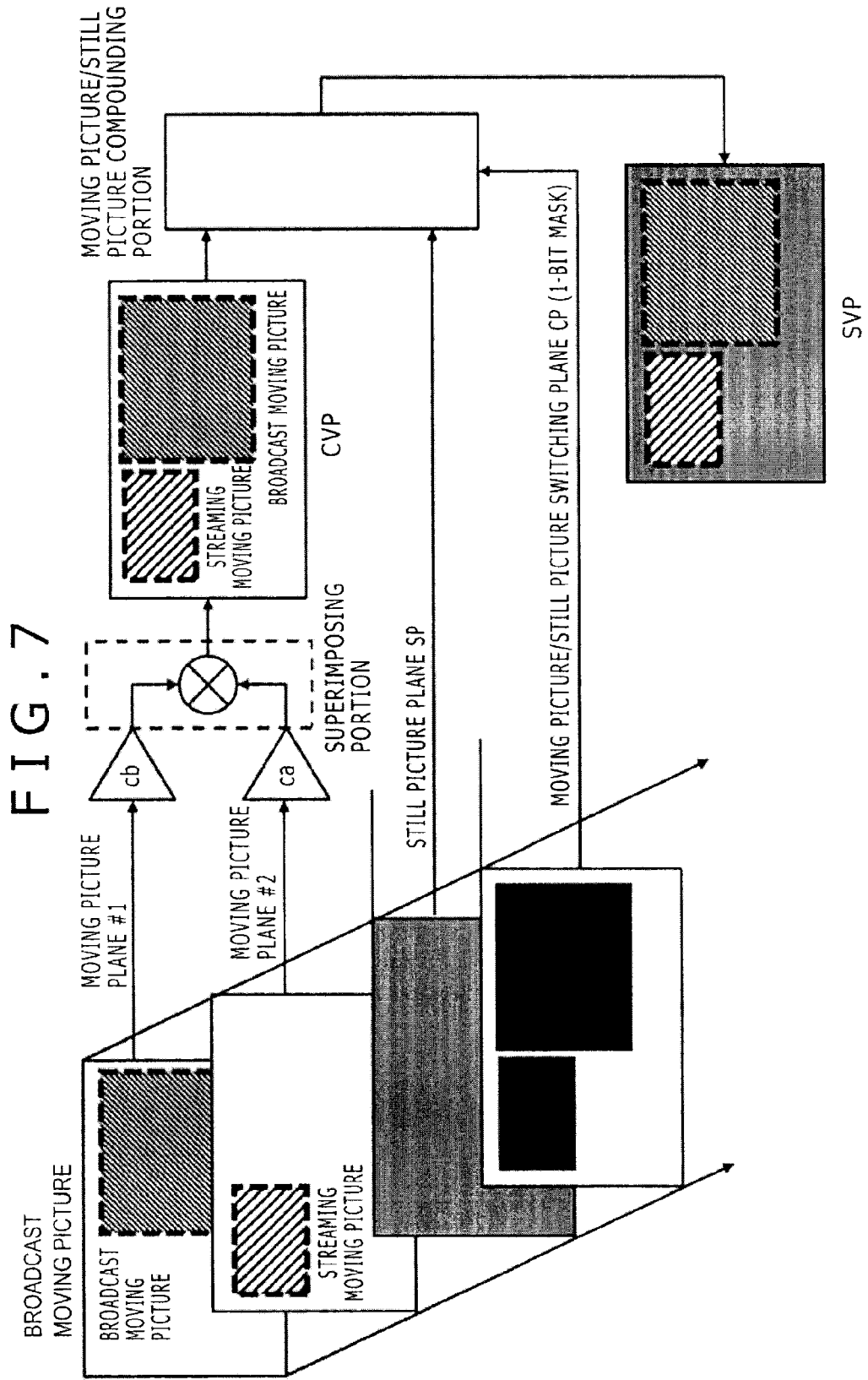
FIG. 7 is a block diagram explaining alternative processing for compounding a still picture plane on a composite moving picture plane CVP.

In addition, FIG. 7 shows another alternative processing for further compounding the still picture plane SP on the composite moving picture plane CVP. The processing shown in the figure is executed in the processor 211. As shown in FIG. 6, the composite moving picture plane CVP is created from two moving pictures "cb" and "ca" resized to lower resolutions. In addition, the moving picture/still picture switching plane CP masks the still plane SP only over the display areas of the two moving pictures "ca" and "cb" resized to lower resolutions. When the pixels of the still picture plane SP are masked in accordance with the pixel values CP, the display areas of the two moving pictures "ca" and "cb" resized to lower resolutions become transparent. Therefore, when the still picture plane after being masked is superimposed on the composite moving picture plane CVP based on, for example, the Porter-Duff rules, as shown in FIG. 7, there is produced a composite plane SVP of the moving picture and the still picture in which the moving pictures "ca" and "cb" are displayed with a frame masked with the still picture plane SP.

Figure 8:
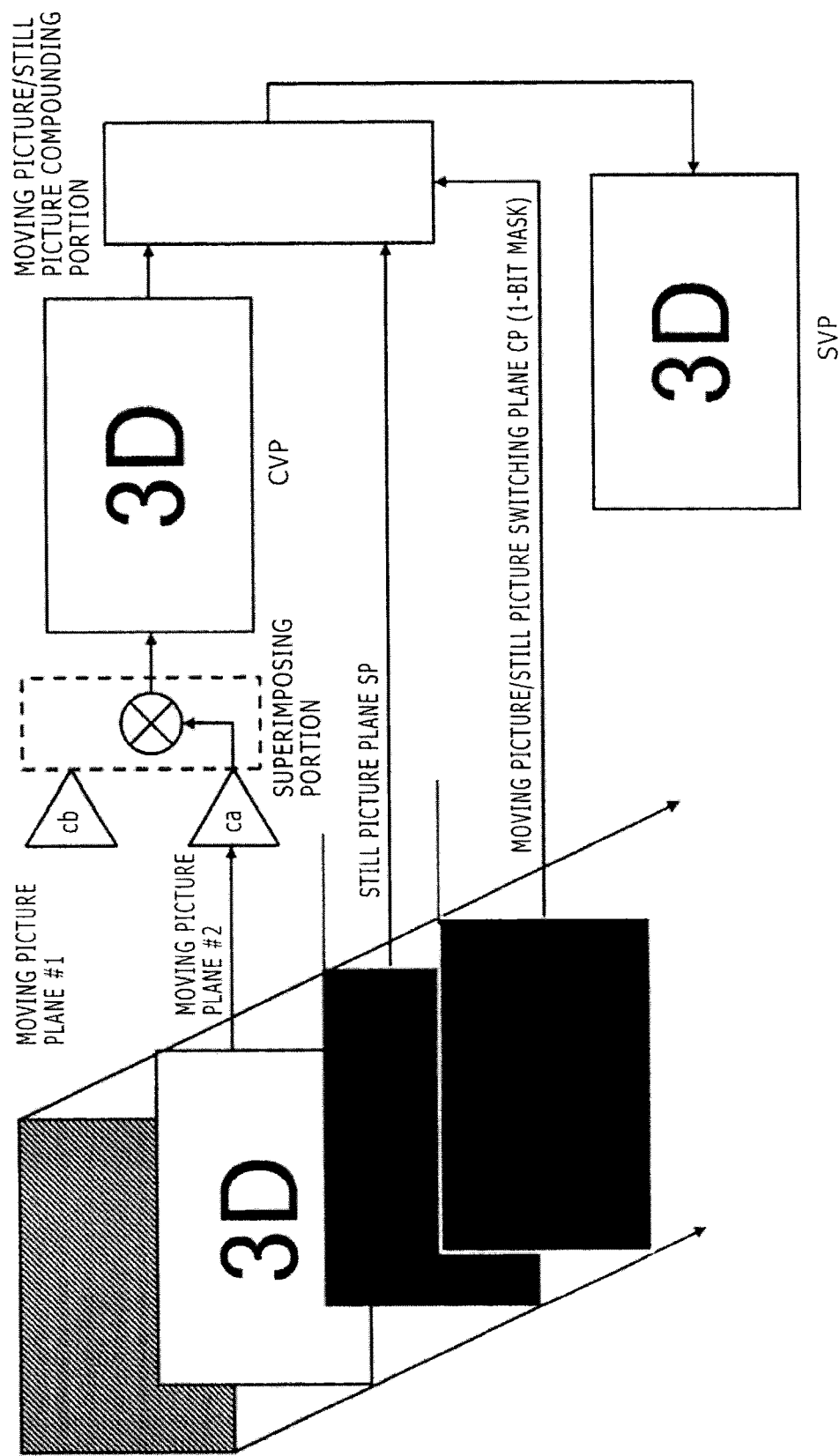
FIG. 8 is a block diagram explaining processing for compounding moving picture planes including a three-dimensional signal.

In addition, FIG. 8 shows processing for compounding moving picture planes including a three-dimensional signal. The processing shown in the figure is executed in the processor 211. It is possible that both the moving picture of the received broadcast (broadcast video) and the streaming moving picture received via the Internet 104 (broadband video) are three-dimensional signals. However, in the hybrid terminal 103 according to this embodiment, when one of the moving picture planes is formed of a three-dimensional signal, due to the restrictions of the hardware, displaying of the other moving picture is stopped. In the case shown in the figure, the streaming moving picture received via the Internet 104, that is, the moving picture "ca" copied on the moving picture plane #2 is composed of a three-dimensional signal of a side-by-side type, and thus the displaying of the moving picture "cb" copied on the moving picture plane #1 is stopped. Therefore, the composite moving picture plane CVP will be solely the three-dimensional moving picture on the moving picture plane #2. In addition, the still picture plane SP and the moving picture/still picture switching plane CP are both disabled, and all of the pixels of those two planes are set to be black. Therefore, the three-dimensional moving picture is displayed at the full resolution as the composite plane SVP.

FIG. 9 shows some examples in which the moving picture/still picture switching plane CP to be applied to the same composite moving picture plane and still moving picture plane is changed, whereby the obtained composite plane SVP of the moving picture and the still picture is changed. In the case (a) in FIG. 9, a moving picture/still picture switching plane CP which does not mask parts of the area of the still picture plane SP is used. Therefore, as shown in the figure, there is obtained a moving picture/still picture composite plane SVP which displays the composite moving picture plane CVP in the area masked by the moving picture/still picture switching plane CP as the background, and displays the still picture plane frontmost in the areas not masked. In addition, in the case (b) of FIG. 9, there is used a moving picture/still picture switching plane CP which masks the whole area (i.e., a plane in which all of the pixels are black). Therefore, as shown in the figure, the still picture plane SP is entirely masked, and there is obtained a moving picture/still picture composite plane SVP in which only the composite moving picture plane CVP behind is displayed. On the other hand, in the case (c) in FIG. 9, there is used the moving picture/still picture switching plane CP which does not mask the area at all (i.e., a plane in which all of the pixels are white). Therefore, as shown in the figure, there is obtained a moving picture/still picture composite plane SVP in which only the frontmost still picture plane SP is displayed while the composite moving picture plane CVP behind is completely covered.

In the technology described in PTL 3, a network browser which interprets a HTML (Hyper Text Markup Language) for displaying a portal picture of network content is executed, thereby displaying the portal picture through which instruction to reproduce the network content is inputted. That is to say, in the technology described in PTL 3, since the portal picture is displayed by executing a process independent from the browser for data broadcasting, it can be said that the broadcast content and the network content do not merge together.

On the other hand, in this embodiment according to the technology disclosed in this description, there is provided plural planes arranged in a predetermined order, including the moving picture plane #1 for broadcast content and the moving picture plane #2 for network content such as a streaming moving picture (refer to FIG. 3), and the processing for compounding the planes as described above can be executed by running a data broadcast application. This embodiment provides a picture through which an instruction to reproduce network content is inputted in such a form that the broadcast content is merged therewith.

Figure 10A:
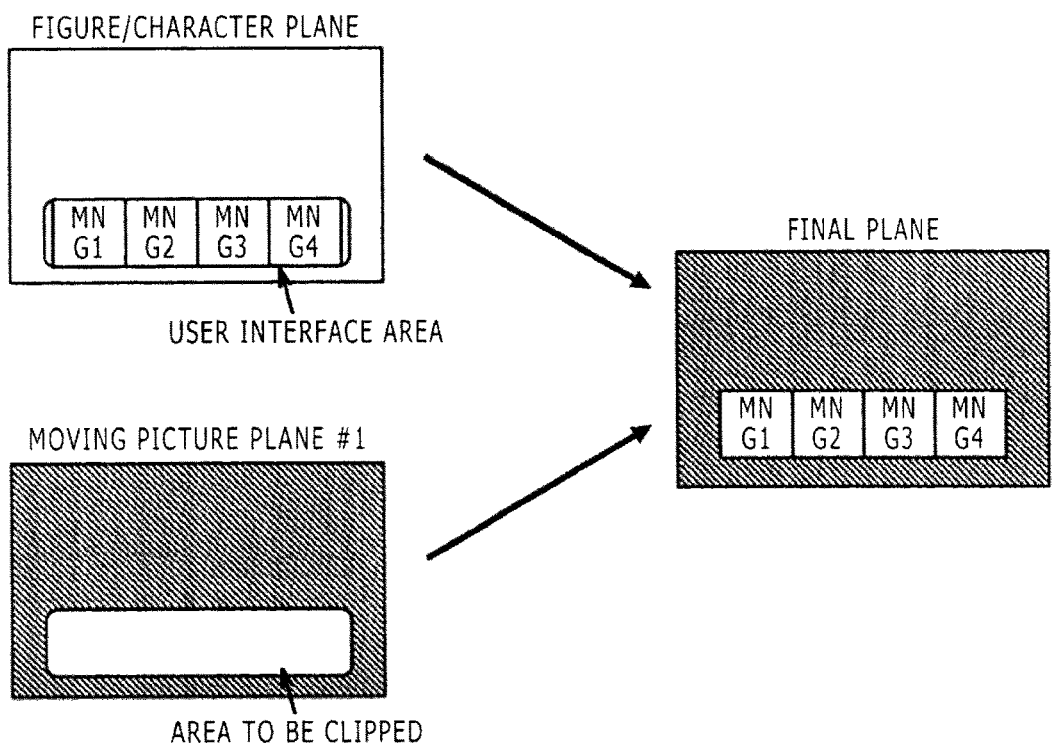
FIG. 10A is a diagram explaining a method of structuring a mosaic-type menu.

FIG. 10A shows a method for configuring a mosaic-type menu as an example of the picture used to input an instruction to reproduce network content.

A moving picture of the received broadcast content is copied on the moving picture plane #1. On the other hand, on the figure and character plane, a user interface used to issue an instruction to reproduce the broadcast content and the streaming moving picture concurrently is copied only over a part of the screen which corresponds to a user interface area. This user interface is a mosaic-type menu in which selection buttons MNG1, MNG2, . . . for selectable plural network content pieces are disposed. The selectable plural network content pieces are generally streaming moving pictures provided from the content server or the like on the Internet 104.

Figure 10B:
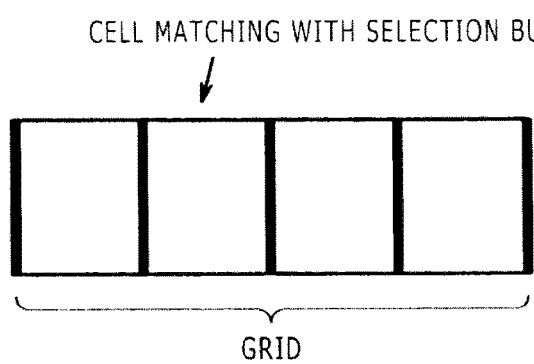
FIG. 10B is a diagram explaining a method of structuring the mosaic-type menu.

Each of the selection buttons MNG1, MNG2, . . . is a moving picture thumbnail of the corresponding streaming moving picture. The moving picture thumbnail, for example, is formed of a MNG (Multiple-image Network Graphics) file composed of a set of PNG (Portable Network Graphics) images. However, the selection buttons MNG1, MNG2, . . . do not need to be a moving picture, and may instead be a still image that symbolizes the corresponding streaming moving picture. Further, the data broadcast application copies a grid (refer to FIG. 10B) composed of plural cells on the figure and character plane described above. Each of the cells of the grid has a URL link representing the location of the corresponding streaming moving picture on the content server. It is noted that the content is not limited to a streaming moving picture on the network, and for example, it may be local content of the hybrid terminal 103. In this case as well, it suffices if the cell possesses the information about the location of the content in URL form. The data broadcast application combines all of the planes in accordance with the disposition order shown in FIG. 3 to obtain a plane including the user interface.

Figure 10C:
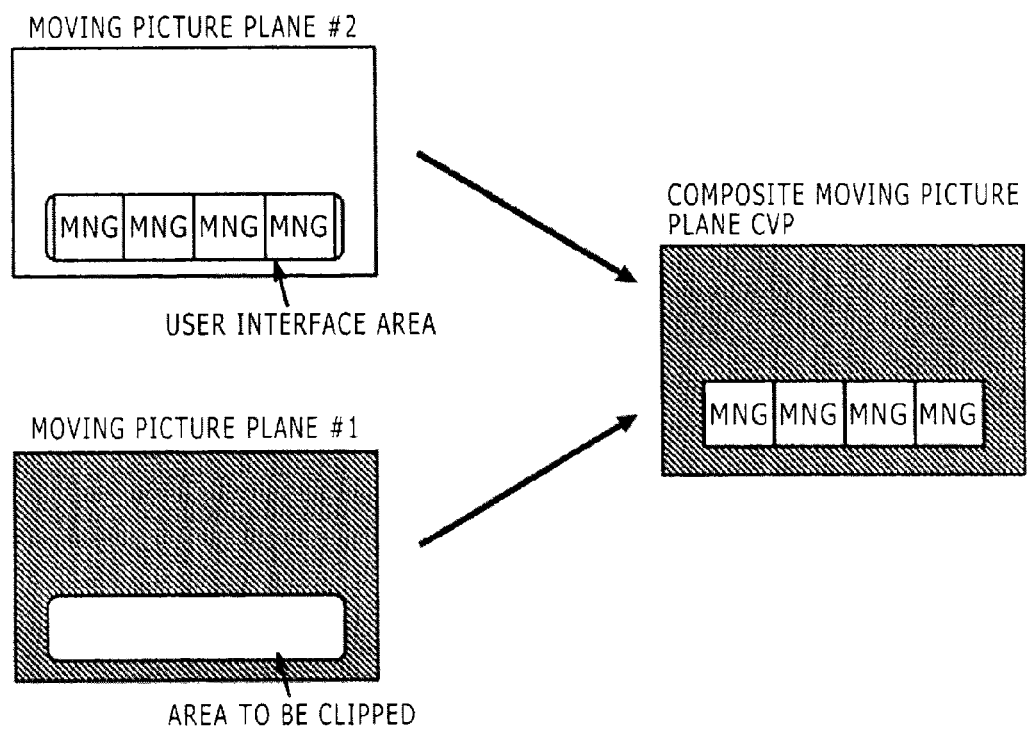
FIG. 10C is a diagram explaining a method of structuring the mosaic-type menu.

Another method of configuring a mosaic-type menu is available. In this method, the data broadcast application limits the display area of the moving picture plate #2 to the user interface area, and mosaic-type menus are combined therewith to form one streaming moving picture, thereby creating the composite moving picture plane CVP (refer to FIG. 10C).

In this case, the data broadcast application further adds the grid composed of the plural cells (refer to FIG. 10B) to the composite moving picture plane CVP described above. The position of the grid matches with the limited display area of the moving picture plane #2, i.e., the mosaic-type menu area, and the cells match with the selection buttons each composed of a moving picture thumbnail. For example, the data broadcast application copies the grid on the figure and character plane to add such a grid to the composite moving picture plane CVP. In addition, each of the cells of the grid has a URL link representing the location of a corresponding streaming moving picture in the content server. It is noted that the content is not limited to a streaming moving picture on a network and, for example, it may be local content of the hybrid terminal 103. In this case as well, it suffices if the cell has the information on the location of the content in URL form.

The broadcaster and the application provider, for example, uploads AV content associated with the broadcast content to the server 105, and delivers a data broadcast application containing a URL link representing the location of the AV content in the web server 105 either by using a broadcast signal or via the Internet 104. Then, each of the selection buttons of the mosaic-type menu contains a URL link to AV content which the broadcaster and the application provider have stored. Therefore, the broadcaster and the application provider can control what should be the streaming moving picture that the user using the data broadcast service of the broadcast program reproduces concurrently with viewing the program.

Figure 11:
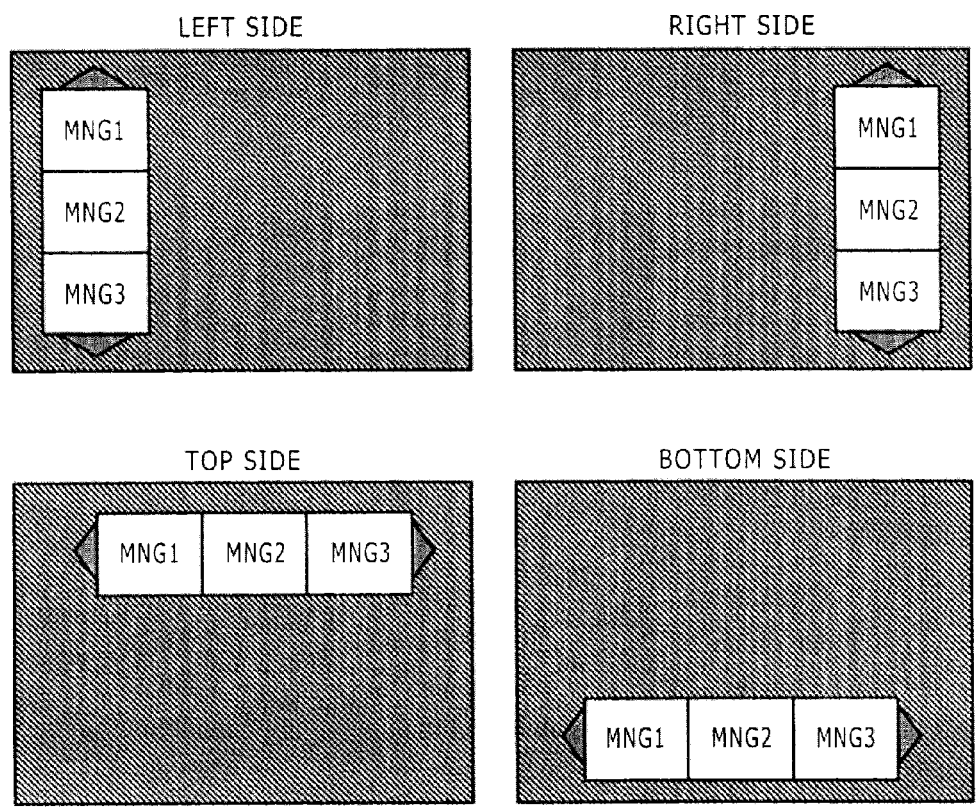
FIG. 11 shows variations of a position of the mosaic-type menu area.

FIG. 11 shows variations of the position of the menu area of the mosaic-type. FIG. 10 shows a mosaic-type menu area composed of a grid having cells arranged in the horizontal direction along the bottom side of the plane (Bottom side). However, alternatively, as shown in FIG. 11, it is also possible to adopt a mosaic-type menu area composed of a grid having cells arranged in the vertical direction along the left side of the plane (Left side), a mosaic-type menu area composed of a grid having cells arranged in the vertical direction along the right side of the plane (Right side), and a mosaic-type menu area composed of a grid having cells arranged in the horizontal direction along the top side of the plane (Top side).

Figure 12:
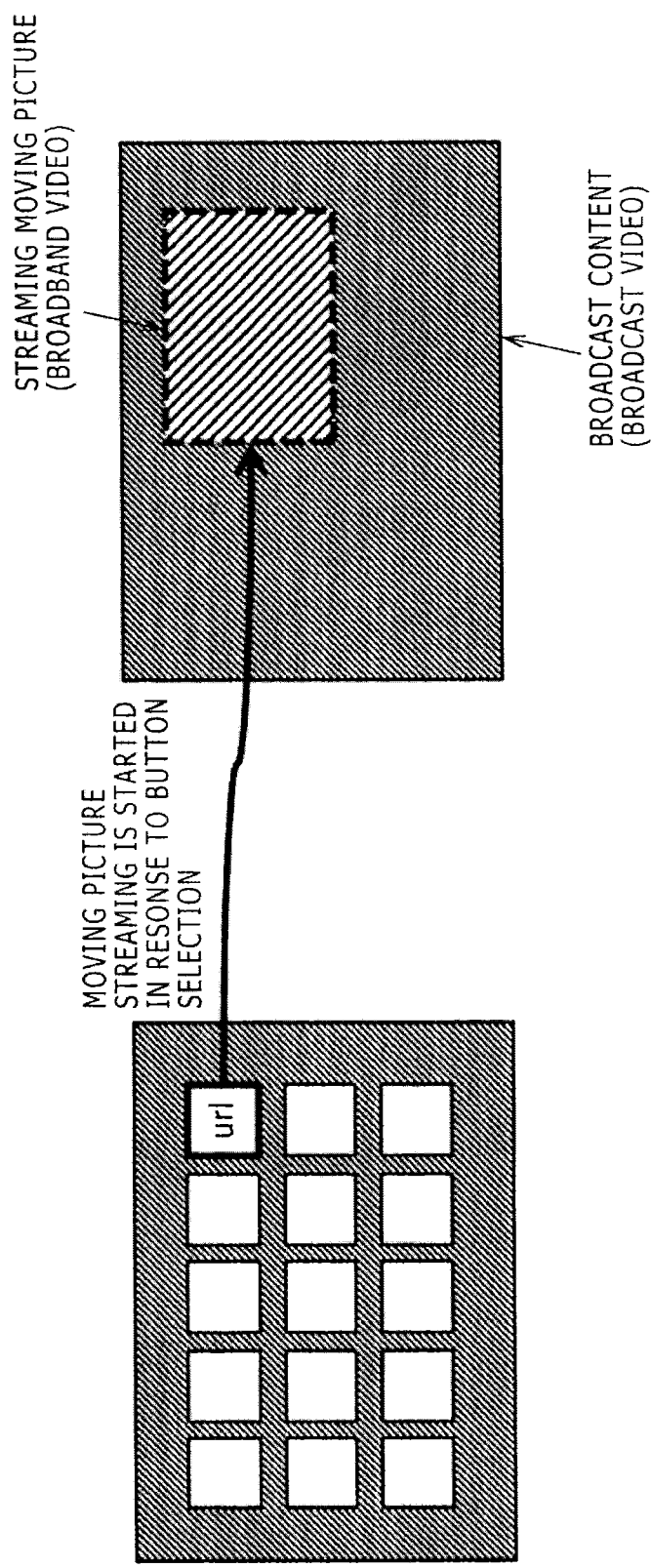
FIG. 12 is a diagram showing a situation in which reproduction of a streaming moving picture is started by a menu selecting operation made within the mosaic-type menu area.

FIG. 12 shows a situation where reproduction of the streaming moving picture is started by a menu selection operation made within the mosaic-type menu area.

As described above, each of the cells of the grid superimposed on the mosaic-type menu area has a URL link representing the location of a corresponding streaming moving picture on the content server. The user of the hybrid terminal 103, for example, can move a cursor within the grid by using a cursor button of a remote controller (not shown) to point the cursor to the cell of the desired thumbnail. On the left side of FIG. 12, the cell to which the cursor is pointed is represented by a frame of a heavy line.

Then, if the user, for example, presses a decision key of the remote controller to select one of the cells in the grid, the data broadcast application starts displaying of an associated streaming moving picture, that is, reproduction of the associated streaming moving picture concurrently with the broadcast content.

As described above, the data broadcast application copies the received picture of the broadcast content on the moving picture plane #1. The data broadcast application also resizes the streaming moving picture downloaded from the Internet 104 to a lower resolution than that of the screen and copies the resized picture on the moving picture plane #2. Then, the data broadcast application superimposes the moving picture plane #1 and the moving picture plane #2 based on, for example, the Porter-Duff rules (refer to FIG. 4), thereby displaying a composite moving picture plane CVP like the one shown on the right side of FIG. 12.

A position (x, y) where the streaming picture "ca" downloaded from the Internet 104 is displayed on the composite moving picture plane CVP, in other words, a position where the resized streaming moving picture "ca" is superimposed on the full screen moving picture "cb" can be set by the data broadcast application.

Figure 13A:
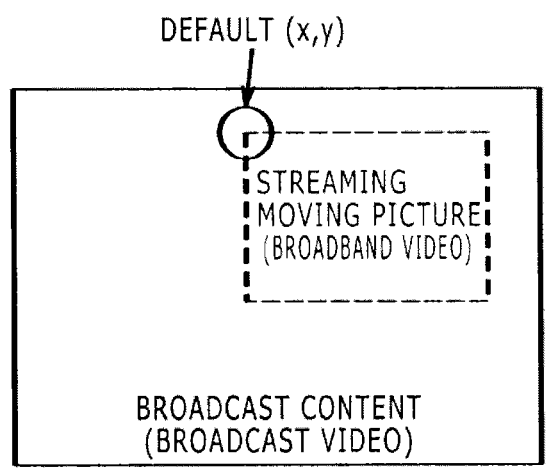
FIG. 13A is a diagram explaining a method of setting a position according to which a resized streaming moving picture "ca" is superimposed on a full screen moving picture "cb" of broadcast content by a data broadcast application.

When the data broadcast application does not explicitly set the display position (x, y) of the streaming moving picture "ca," the streaming moving picture "ca" is displayed at a default display position "default (x, y)," as shown in FIG. 13A.

Figure 13B:
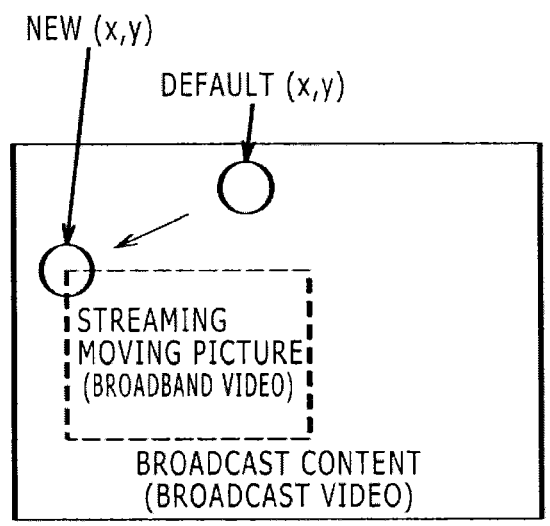
FIG. 13B is a diagram explaining the method of setting the position according to which the resized streaming moving "ca" is superimposed on the full screen moving picture "cb" of the broadcast content by the data broadcast application.

The user can indicate a new display position "new (x, y)" for the streaming moving picture "ca" by, for example, using the cursor button of the remote controller. When the data broadcast application sets this new display position "new (x, y)," as shown in FIG. 13B, the streaming moving picture "ca" is displayed at the new display position new "(x, y)."

In addition, the data broadcast application can change the order of the moving picture planes. The user instructs the switching of the order of the moving picture planes by, for example, manipulating a green button on the remote controller. FIG. 14 shows a situation in which the switching of the order of the moving picture plane #1 and the moving picture plane #2 is carried out. Upon switching of the order, the resolution of the streaming moving picture on the moving picture plane #2 is set to the full resolution, and also the moving picture of the received broadcast on the moving picture plane #1 is resized. Then, the moving picture "ca" of the received broadcast copied on the moving picture plane #1 is superimposed on the streaming moving picture "cb" copied on the moving picture plane #2, thereby creating the composite moving picture plane CVP.

Figure 15:
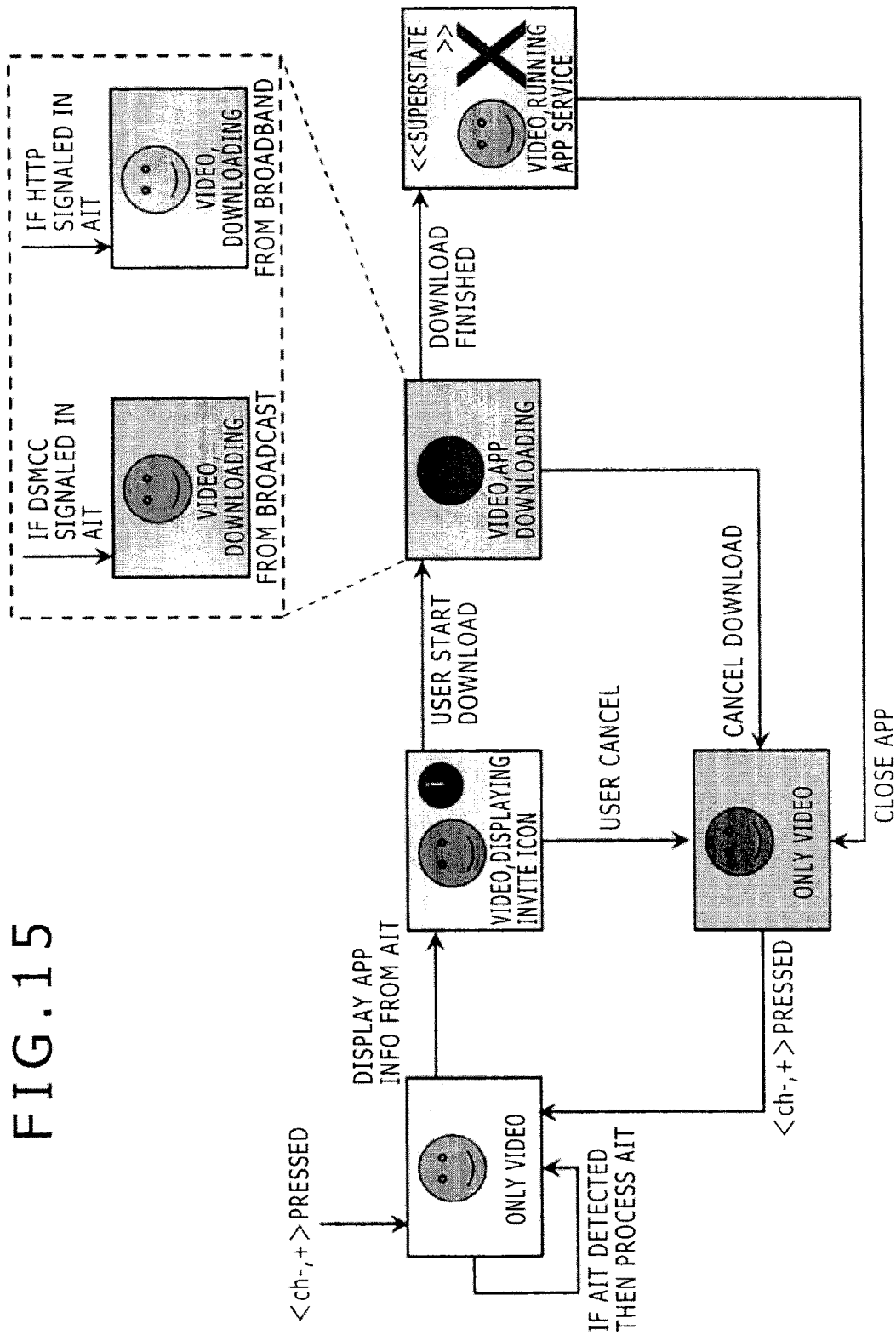
FIG. 15 is a diagram showing screen transition in a displaying portion 220 of a hybrid terminal 103.

FIG. 15 illustrates screen transition on the display portion 220 of the hybrid terminal 103.

When a normal broadcast program is being received, the screen state is in an "Only Video" state in which only the moving picture of the received broadcast program is displayed on the screen. The user, for example, manipulates a channel button or a +/− key of the remote controller to change the broadcast program displayed. In addition, in this state, whether or not AIT is contained in the received signal is detected. AIT is control information described in order to control the operation of the data broadcast application.

When AIT is detected, the information on the data broadcast application obtained from the AIT is displayed (display app info from AIT) after processing the AIT received by the hybrid terminal 103. Then, the screen state transits to a "Video, displaying invite icon" state in which the moving picture of the broadcast program is displayed with an invite icon (invite icon).

Here, when the user instructs download start for the data broadcast application, the screen state shifts to a "Video, app downloading" state in which the broadcast program is displayed while downloading of the data broadcast application is being executed. On the other hand, when the user cancels download of the data broadcast application, the screen state transits to the "Only Video" state in which only the moving picture of the received broadcast program is displayed. When the user manipulates the channel button or the +/− key on the remote controller, the display screen returns to the picture of the original channel.

In the "Video, app downloading" state in which the broadcast program is displayed while the data broadcast application is being downloaded, the download of the data broadcast application is carried out following the description of the AIT. For example, if DSM-CC (Digital Storage Media-Command and Control) is specified in the AIT, the hybrid terminal 103 downloads the data broadcast application from the broadcast signal (Video, downloading from broadcast). On the other hand, when a HTTP (Hyper Text Transfer Protocol) is specified in the AIT, the hybrid terminal 103 downloads the data broadcast application via the communication network such as the Internet (Video, downloading from broadband).

When the download of the data broadcast application is completed, the hybrid terminal 103 transits to a "Video, running app service" state in which the data broadcast application is being run.

When the download is canceled by an instruction issued from the user or another cause during the download of the data broadcast application, the screen state transits to the "Only Video" state in which only the moving picture of the received broadcast program is displayed. If the user manipulates the channel button or the +/− key on the remote controller, the display screen returns to the picture of the original channel.

In addition, when the application is ended by an instruction given by the user or another cause in the "Video, running app service" state in which the data broadcast application is being run (close app), the display screen transits to the "Only Video" state in which only the moving picture of the received broadcast program is displayed. If the user manipulates the channel button or the +/− key on the remote controller, the display screen returns back to the picture of the original channel.

Figure 16:
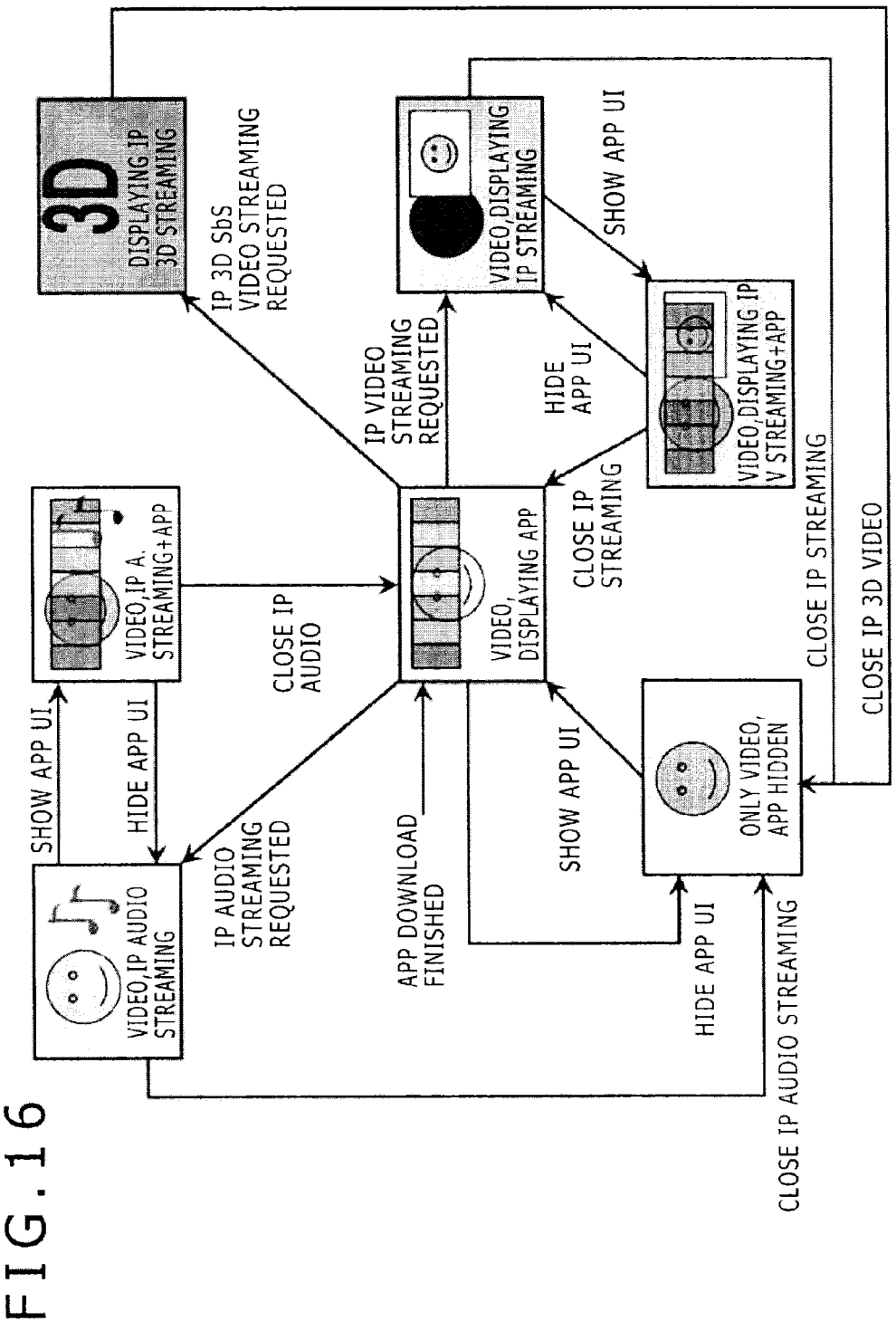
FIG. 16 is a diagram showing the screen transition in more detail of when the screen is in a "Video, running app service" state in which the data broadcast application is being run.

FIG. 16 shows the screen transition in more detail of when the screen state is in the "Video, running app service" state, the state where the data broadcast application is being run. The central part of FIG. 16 shows the initial screen state "Video, displaying app" right after the download of the data broadcast application has ended. At this time, a mosaic-type menu area as those shown in FIG. 10 is displayed on the screen as a user interface (App UI) for the data broadcast application.

The user can request streaming of desired content by performing an operation for selecting a cell of the grid having the same size as that of the mosaic-type menu area and thereby selecting the menu (refer to FIG. 12).

When moving picture streaming has been requested through the mosaic-type menu area (IP Video streaming requested), the screen state transits to a "Video, displaying IP streaming" state as shown in FIG. 4, in which the screen displays a composite moving picture CVP obtained by superimposing the moving picture "cb" of the broadcast program copied on the moving picture plane #1 and the streaming moving picture "ca" copied on the moving picture plane #2. Here, when an instruction to display the user interface of the data broadcast application is issued (Show App UI), the screen state transits to a "Video, displaying IP streaming +app" state in which the mosaic-type menu area is displayed. When an instruction to non-display or hide the user interface is issued (hide App UI), the mosaic-type menu area is hidden and thus the screen state returns to the screen state "Video, displaying IP streaming" described above. Further, when an instruction to end the moving picture streaming is issued through the mosaic-type menu area (close IP streaming), the screen state returns to the initial screen state "Video displaying app."

When music streaming is requested through the mosaic-type menu area (IP audio streaming requested), the screen transits to a "Video, IP audio streaming" state in which the moving picture "cb" of the broadcast program on the moving picture plane #1 is displayed concurrently with the music streaming. Here, when an instruction to display the user interface of the data broadcast application is issued (Show App UI), the screen state transits to a "Video, IP A. streaming +app" state in which the mosaic-type menu area is displayed. When an instruction not to display or hide the user interface is issued (hide App UI), the mosaic-type menu area is hidden and thus the screen state returns to the screen state "Video, IP audio streaming" described above. Further, when an instruction to end the music streaming is issued through the mosaic-type menu area (close IP audio), the screen state returns to the initial screen state "Video displaying app."

When moving picture streaming of a three-dimensional signal is requested through the mosaic-type menu area (IP 3D SbS video streaming requested), the screen state transits to a "Displaying IP 3D streaming" state in which the screen displays a composite moving picture plane obtained by superimposing a three-dimensional streaming moving picture "ca" copied on the moving picture plane #2, as shown in FIG. 8. The hybrid terminal 103 of this embodiment is configured to stop displaying of other moving picture planes when a three-dimensional moving picture is to be displayed, due to restrictions of the hardware (mentioned above).

When an instruction to end the moving picture streaming is issued (close IP streaming) in the screen state "Video, displaying IP streaming" in which a composite moving picture plane CVP is displayed; when an instruction to end the music streaming is issued (close IP audio streaming) in the screen state "Video, IP audio streaming" in which a moving picture "cb" of the broadcast program on the moving picture plane #1 is displayed concurrently with the music streaming; and when an instruction to end the three-dimensional moving picture streaming is issued (close IP 3D video) in the screen state "Displaying IP 3D streaming" in which a three-dimensional streaming moving picture is displayed, the screen state transits to the screen state "Only Video, app hiden" in which the user interface (the mosaic-type menu area) of the application is hidden. After that, when an instruction to display the user interface of the data broadcast application is issued (Show App UI), the screen state returns to the initial screen state "Video, displaying app." In addition, when an instruction not to display or hide the user interface is issued in the initial screen state "Video, displaying app" (hide App UI), the screen state transits to the screen state "Only Video, app hiden."

FIG. 17 shows functional blocks realized by the processor 211 executing processes. For example, when the Java (registered trademark) technology is applied, the functional blocks correspond to the class files. In the following, processes executed in the functional blocks will be described focusing on functions associated with the picture controlling shown in FIGS. 15 and 16.

Process TS executes processing for receiving an MPEG2 transport stream delivered from the broadcaster (Broadcaster). Process TS executes the processing for receiving a transport stream every time the channel is tuned. In addition, Process TS executes processing for detecting an AIT in data-broadcast data separated from the transport stream.

Decode A/V executes processing for decoding AV data separated from the transport stream by using the decoder 204.

Decode AIT executes processing for decoding the AIT detected by Process TS. Download App executes download processing in accordance with the decoded AIT description when an instruction to download a data broadcast application is issued. When DSM-CC is specified in the AIT, Download App downloads the data broadcast application from the broadcast signal. When HTTP is specified in the AIT, Download App downloads the data broadcast application from the application server via the Internet 104.

When Download App completes downloading of the data broadcast application, Run App starts the data broadcast application. As a result, the hybrid terminal 103 transits to the state "Video, running app service" in which the data broadcast application is being run, described above with reference to FIG. 15.

Display App carries out displaying/non-displaying of a user interface for the data broadcast application, such as the mosaic-type menu area. For example, in the screen states "Video, displaying IP streaming," "Video IP audio streaming," and "Only Video, app hiden," Display App carries out displaying (show App UI) and non-displaying (hide App UI) of the user interface.

When the screen is in the initial state "Video, displaying app" (refer to FIG. 16), Select Video executes processing for selecting a moving picture in accordance with an operation made by the user through the user interface. Request A/V Streaming requests the corresponding content server (Media Server) to execute streaming of the moving picture selected by Select Video. Buffer A/V Streaming buffers the moving picture stream received by Request A/V Streaming. Decode A/V Streaming decodes the buffered moving picture stream by using the broadband decoder 206.

Enable PiP presentation enables processing for creating a picture-in-picture image in which a moving picture is displayed inside a moving picture, such as the processing shown in FIG. 4. In addition, Choose the PiP order selects the disposition order of the images composing the picture-in-picture image in accordance with an instruction issued by the user or the like. For example, as shown in FIG. 14, the disposition order of the moving picture plane #1 and the moving picture plane #2 is switched. Display PiP carries out displaying of the picture-in-picture image including the moving picture of the received broadcast and the downloaded stream moving picture.

However, when the moving picture stream selected by Select Video is a three-dimensional signal, Display 3D carries out displaying of the three-dimensional moving picture stream while Stop Broadcast video stops displaying of the received stream. When the moving picture stream of the received broadcast is a three-dimensional signal, displaying of the moving picture stream downloaded is stopped. The reason a picture-in-picture image is not displayed when one of the moving picture streams is a three-dimensional signal is based on the restrictions of the hardware of the hybrid terminal 103 (mentioned earlier).

Choose the Audio source carries out selection of an audio or music source. For example, when music streaming is requested through the mosaic-type menu area, the requested music streaming is selected as the music source and is outputted as the sound. In addition, when an instruction to end the music streaming is issued (close IP audio) in the screen state "Video, IP audio streaming," in which displaying of the moving picture "cb" of the broadcast program and music streaming are carried out, the broadcast program is selected as the music source and is outputted as the sound.

Incidentally, when the moving picture stream is purchased from a paid moving picture site (Storefront), Check authorization carries out an authorization process for Storefront. In addition, Request Content list requests a list of available content pieces from Storefront, and Display Video List displays the list.

The technology disclosed in this description may also take the following configurations.

(1) A receiver, including: a broadcast receiving portion receiving a broadcast signal; a network communication portion transmitting and receiving information via a network; a video memory including a first plane and a second plane, the first plane copying the information received by the broadcast receiving portion, the second plane copying the information received by the network communication portion; a display portion displaying the information in the video memory; and a control portion controlling a display output of the information copied on the planes in the video memory to the display portion, wherein the control portion runs a data broadcast application received by one of the broadcast receiving portion and the network communication portion, executes a process compounding plural planes in the video memory including the first plane and the second plane, and displays the resulting composite plane on the display portion.

(2) The receiver described in above (1), wherein the first plane and the second plane are disposed in this order from backward to forward within the video memory, and the other planes of the plural planes are disposed in a predetermined order in front of the second plane, and the control portion executes, as a process realized by running the data broadcast application, the process compounding the planes in accordance with the disposition order.

(3) The receiver described in above (2), wherein, as a process realized by running the data broadcast application, the control portion copies on the first plane broadcast content received by the broadcast receiving portion, copies on the second plane a user interface used to instruct concurrent reproduction of the broadcast content and network content received by the network communication portion, and compounds the first plane and the second plane to create a plane in which the user interface is superimposed on the broadcast content.

(4) The receiver described in above (3), wherein the network content reproduced concurrently with the broadcast content is a streaming moving picture, and the user interface is a menu in which moving picture thumbnails of plural streaming moving pictures capable of being reproduced concurrently are disposed as selection buttons.

(5) The receiver described in above (3), wherein a location of the network content capable of being reproduced concurrently with the broadcast content is specified by the data broadcast application, the user interface is a menu in which selection buttons each including a link to a location of network content capable of being reproduced concurrently are disposed, and in response to selection of any of the selection buttons, the control portion copies on the second plane the network content received by the network communication portion in accordance with the link contained in the selected selection button, compounds the first plane and the second plane, and concurrently reproduces the broadcast content and the network content.

(6) A display controlling method, including: a first copying step of copying information received as a broadcast signal on a first plane in a video memory by first copying means, the first copying means being realized by running a data broadcast application by a computer; a second copying step of copying information received via a network on a second plane in the video memory by second copying means, the second copying means being realized by running the data broadcast application by the computer; a compounding step of compounding plural planes in the video memory including the first plane and the second plane by compounding means, the compounding means being realized by running the data broadcast application by the computer; and an outputting step of outputting a composite plane to be displayed created by the compounding by displaying means, the displaying means being realized by running the data broadcast application by the computer.

(7) A broadcast system, including: a broadcast station providing a data broadcast service including a combination of broadcast content and a data broadcast; a server providing network content; and a hybrid terminal receiving a broadcast signal delivered from the broadcast station and transmitting and receiving information via a network, wherein the hybrid terminal includes a video memory including a first plane copying the information received as the broadcast signal and a second plane copying the information received from the server, and a display portion displaying the information in the video memory, and executes a data broadcast application received from one of the broadcast station and the server to execute a process compounding plural planes including the first plane and the second plane, thereby displaying the resulting composite plane on the displaying portion.

(8) A computer program written in a computer-readable form for causing a computer to function as: first copying means configured to copy information received as a broadcast signal on a first plane in a video memory; second copying means configured to copy information received via a network on a second plane in the video memory; compounding means configured to compound plural planes in the video memory including the first plane and the second plane; and outputting means configured to output the resulting composite plane to be displayed created by the compounding means.

INDUSTRIAL APPLICABILITY

The technology disclosed in this description has been described in detail so far referring to particular embodiments of the present description. However, it is obvious that modifications, substitutions, alterations and combinations of the embodiments can be made by those skilled in the art without departing from the gist of the technology disclosed in this description.

Although the technology disclosed in this description can be realized by, for example, applying the Java (registered trademark) technology, the gist of the technology disclosed in this description is by no means limited to the Java technology. In addition, AV content delivered as the broadcast signal, AV content transmitted via the network, data for data broadcast, and the like are by no means limited to a specific file format.

In a word, the technology disclosed in this description has been described using examples, and the contents described in this description should not be construed in a limiting sense. To judge the spirit and scope of the technology disclosed in this description, the appended claims should be referred to.

REFERENCE SIGNS LIST

100 Hybrid broadcast system
101 Broadcast satellite
102 Broadcast station
103 Receiving terminal (hybrid terminal)
104 Internet (broadband network)
105 Server
201 Tuner
202 Demodulator
203 Demultiplexer
204 Broadcast decoder
205 Data communication portion
206 Broadband decoder
210 AV output controlling portion
211 Processor
212 System memory
213 Video memory

The invention claimed is:

1. A receiver, comprising:
a broadcast interface configured to receive a broadcast signal;
a network communication interface configured to transmit and receive information via internet;
a video memory including a first plane and a second plane, said first plane copying moving picture signals received by said broadcast interface, said second plane copying streaming moving picture signals received by said network communication interface, said first plane and said second plane being disposed in this order from backward to forward within said video memory; and
circuitry configured to:
  store, in the video memory, said first plane copying the moving picture signals received by said broadcast interface at a full resolution of the received moving picture signals;
  resize the streaming moving picture signals received by said network communication interface to a first lower resolution lower than an original resolution of the received streaming moving picture signals;
  store, in the video memory, said second plane copying the streaming moving picture signals resized to the first lower resolution;
  determine whether to download a data broadcast application via said broadcast interface or via said network communication interface based on information specified in the received broadcast signal;
  run the data broadcast application, the data broadcast application including a link to a location of the streaming moving picture signals;
  compound said first plane and said second plane in said video memory;
  display, on a display, a plurality of planes including the first plane and the second plane; and
  in response to a user input, change the order of said first plane and said second plane such that said first plane and said second plane are disposed in this order from forward to backward within said video memory, resize the moving picture signals received by said broadcast interface from the full resolution to a second lower resolution lower than the full resolution, and resize the streaming moving picture signals received by said network communication interface from the first lower resolution to the original resolution of the received streaming moving picture signals.

2. The receiver according to claim 1, wherein
other planes of said plurality of planes are disposed in a predetermined order in front of said second plane, and
said circuitry compounds, as a process realized by running the data broadcast application, said plurality of planes in accordance with the predetermined order.

3. The receiver according to claim 2, wherein, as a process realized by running the data broadcast application, said circuitry copies on said first plane the moving picture signals received by said broadcast interface, copies on said second plane a user interface used to instruct concurrent reproduction of the moving picture signals and said streaming moving picture signals, and compounds said first plane and said second plane to create a plane in which said user interface is superimposed on the moving picture signals.

4. The receiver according to claim 3, wherein
said user interface is a menu in which moving picture thumbnails of said streaming moving picture signals capable of being reproduced concurrently are disposed as selection buttons.

5. The receiver according to claim 3, wherein
the location of the streaming moving picture signals capable of being reproduced concurrently with the moving picture signals is specified by the data broadcast application,
said user interface is a menu in which selection buttons each including the link to the location of the streaming moving picture signals are disposed, and
in response to selection of any of said selection buttons, said circuitry copies on said second plane the streaming moving picture signals in accordance with the link contained in the selected selection button, compounds said first plane and said second plane, and concurrently reproduces the moving picture signals and the streaming moving picture signals.

6. The receiver according to claim 1, further comprising the display that displays the plurality of planes including the first plane and the second plane.

7. The receiver according to claim 1, wherein the circuitry changes a position of the second plane on the display in response to the user input.

8. The receiver according to claim 1, wherein the circuitry is configured to download the data broadcast application via said broadcast interface when first information is determined to be specified in the received broadcast signal and via said network communication interface when second information is determined to be specified in the received broadcast signal.

9. The receiver according to claim 8, wherein said first information corresponds to Digital Storage Media-Command and Control (DSM-CC) and said second information corresponds to a Hyper Text Transfer Protocol (HTTP).

10. A display controlling method, comprising:
receiving, using a broadcast interface, a broadcast signal;
transmitting and receiving, using a network communication interface, information via internet;
storing, in a video memory, a first plane and a second plane, said first plane copying moving picture signals received by said broadcast interface, said second plane copying streaming moving picture signals received by said network communication interface, said first plane and said second plane being disposed in this order from backward to forward within said video memory;
storing, in the video memory, said first plane copying the moving picture signals received by said broadcast interface at a full resolution of the received moving picture signals;
resizing, using circuitry, the streaming moving picture signals received by said network communication interface to a first lower resolution lower than an original resolution of the received streaming moving picture signals;
storing, in the video memory, said second plane copying the streaming moving picture signals resized to the first lower resolution;
determining, using the circuitry, whether to download a data broadcast application via said broadcast interface or via said network communication interface based on information specified in the received broadcast signal;
running, using the circuitry, the data broadcast application received by said broadcast interface, the data broadcast application including a link to a location of the streaming moving picture signals;
compounding, using the circuitry, said first plane and said second plane in said video memory;
displaying, on a display, a plurality of planes including the first plane and the second plane; and
in response to a user input, changing the order of said first plane and said second plane such that said first plane and said second plane are disposed in this order from forward to backward within said video memory, resizing the moving picture signals received by said broadcast interface from the full resolution to a second lower resolution lower than the full resolution, and resizing the streaming moving picture signals received by said network communication interface from the first lower resolution to the original resolution of the received streaming moving picture signals.

11. A non-transitory computer readable medium including executable instructions, which when executed by a computer cause the computer to execute a display controlling method, the method comprising:
receiving, using a broadcast interface, a broadcast signal;
transmitting and receiving, using a network communication interface, information via internet;
storing, in a video memory, a first plane and a second plane, said first plane copying moving picture signals received by said broadcast interface, said second plane copying streaming moving picture signals received by said network communication interface, said first plane and said second plane being disposed in this order from backward to forward within said video memory;
storing, in the video memory, said first plane copying the moving picture signals received by said broadcast interface at a full resolution of the received moving picture signals;
resizing the streaming moving picture signals received by said network communication interface to a first lower resolution lower than an original resolution of the received streaming moving picture signals;
storing, in the video memory, said second plane copying the streaming moving picture signals resized to the first lower resolution;
determining whether to download a data broadcast application via said broadcast interface or via said network communication interface based on information specified in the received broadcast signal;
running the data broadcast application received by said broadcast interface, the data broadcast application including a link to a location of the streaming moving picture signals;
compounding said first plane and said second plane in said video memory;
displaying, on a display, a plurality of planes including the first plane and the second plane; and
in response to a user input, changing the order of said first plane and said second plane such that said first plane and said second plane are disposed in this order from forward to backward within said video memory, resizing the moving picture signals received by said broadcast interface from the full resolution to a second lower resolution lower than the full resolution, and resizing the streaming moving picture signals received by said network communication interface from the first lower resolution to the original resolution of the received streaming moving picture signals.

* * * * *